US011317497B2

(12) United States Patent
Reed et al.

(10) Patent No.: US 11,317,497 B2
(45) Date of Patent: Apr. 26, 2022

(54) PHOTOCONTROLLER AND/OR LAMP WITH PHOTOCONTROLS TO CONTROL OPERATION OF LAMP

(71) Applicant: Express Imaging Systems, LLC, Renton, WA (US)

(72) Inventors: William G. Reed, Seattle, WA (US); Richard Dolf, Seattle, WA (US)

(73) Assignee: Express Imaging Systems, LLC, Renton, WA (US)

( * ) Notice: Subject to any disclaimer, the term of this patent is extended or adjusted under 35 U.S.C. 154(b) by 0 days.

(21) Appl. No.: 16/906,800

(22) Filed: Jun. 19, 2020

(65) Prior Publication Data

US 2020/0404763 A1    Dec. 24, 2020

Related U.S. Application Data

(60) Provisional application No. 62/864,121, filed on Jun. 20, 2019, provisional application No. 63/010,412, filed on Apr. 15, 2020.

(51) Int. Cl.
*H05B 47/11* (2020.01)
*G01J 1/04* (2006.01)
(Continued)

(52) U.S. Cl.
CPC ............ *H05B 47/11* (2020.01); *G01J 1/0488* (2013.01); *G01J 1/4204* (2013.01); *H05B 47/16* (2020.01)

(58) Field of Classification Search
CPC ....... H05B 47/11; H05B 47/16; G01J 1/0488; G01J 1/4204
See application file for complete search history.

(56) References Cited

U.S. PATENT DOCUMENTS 2,240,050 A    4/1941  Nuebling
2,745,055 A    5/1956  Woerdemann
(Continued)

FOREIGN PATENT DOCUMENTS

DE    8901221 U1    6/1989
EP    1734795 A1    12/2006
(Continued)

OTHER PUBLICATIONS

"Lcd Backlight I/O Ports and Power Protection Circuit Design," dated May 2, 2011, retrieved Jun. 10, 2011, from http://www.chipoy.info/gadgets/lcd-backlight-i-o-ports-and-power-pr . . . , 4 pages.
(Continued)

*Primary Examiner* — Minh D A
(74) *Attorney, Agent, or Firm* — Cozen O'Connor

(57) ABSTRACT

A system to control solid state light sources, including a photosensor responsive primarily to wavelengths of light outside the emitted light band of wavelengths that the solid state light sources emit when the solid state light sources are in the ON state, and which produces a light level signal representative of a level of sensed light primarily for wavelengths outside of the emitted light band of wavelengths. A set of circuitry receives the light level signal representative of the sensed level of light from the photosensor, determines a contribution by the solid state light sources to the sensed level of light, and uses a compensated light level or a compensated threshold in assessing a dusk condition or a dawn condition when the solid state light sources are in the ON state to compensate for the contribution by the solid state light sources to the sensed level of light.

28 Claims, 9 Drawing Sheets

(51) Int. Cl.
*G01J 1/42* (2006.01)
*H05B 47/16* (2020.01)

(56) References Cited

U.S. PATENT DOCUMENTS

| | | | |
|---|---|---|---|
| 3,374,396 A | 3/1968 | Bell et al. |
| 4,153,927 A | 5/1979 | Owens |
| 4,237,377 A | 12/1980 | Sansum |
| 4,663,521 A | 5/1987 | Maile |
| 5,086,379 A | 2/1992 | Denison et al. |
| 5,160,202 A | 11/1992 | Legare |
| 5,161,107 A | 11/1992 | Mayeaux et al. |
| 5,230,556 A | 7/1993 | Canty et al. |
| 5,254,908 A | 10/1993 | Alt et al. |
| 5,276,385 A | 1/1994 | Itoh et al. |
| 5,343,121 A | 8/1994 | Terman et al. |
| 5,349,505 A | 9/1994 | Poppenheimer |
| 5,450,302 A | 9/1995 | Maase et al. |
| 5,528,110 A | 6/1996 | Archdekin |
| 5,561,351 A | 10/1996 | Vrionis et al. |
| 5,589,741 A | 12/1996 | Terman et al. |
| 5,619,127 A | 4/1997 | Warizaya |
| 5,808,294 A | 9/1998 | Neumann |
| 5,838,226 A | 11/1998 | Houggy et al. |
| 5,869,960 A | 2/1999 | Brand |
| 5,892,331 A | 4/1999 | Hollaway |
| 5,892,335 A | 4/1999 | Archer |
| 5,962,982 A | 10/1999 | Mancuso |
| 5,995,350 A | 11/1999 | Kopelman |
| 6,111,739 A | 8/2000 | Wu et al. |
| 6,119,076 A | 9/2000 | Williams et al. |
| 6,149,283 A | 11/2000 | Conway et al. |
| 6,154,015 A | 11/2000 | Ichiba |
| 6,198,233 B1 | 3/2001 | McConaughy |
| 6,211,627 B1 | 4/2001 | Callahan |
| 6,377,191 B1 | 4/2002 | Takubo |
| 6,392,541 B1 | 5/2002 | Bucher et al. |
| 6,429,621 B1 | 8/2002 | Arai |
| 6,587,558 B2 | 7/2003 | Lo |
| 6,612,720 B1 | 9/2003 | Beadle |
| 6,674,060 B2 | 1/2004 | Antila |
| 6,724,159 B2 | 4/2004 | Gutta et al. |
| 6,746,274 B1 | 6/2004 | Verfuerth |
| 6,753,842 B1 | 6/2004 | Williams et al. |
| 6,828,911 B2 | 12/2004 | Jones et al. |
| 6,841,947 B2 | 1/2005 | Berg-johansen |
| 6,880,956 B2 | 4/2005 | Zhang |
| 6,888,323 B1 | 5/2005 | Null et al. |
| 6,902,292 B2 | 6/2005 | Lai |
| 6,948,826 B2 | 9/2005 | Fogerlie |
| 6,980,119 B2 | 12/2005 | Toulmin et al. |
| 7,019,276 B2 | 3/2006 | Cloutier et al. |
| 7,066,622 B2 | 6/2006 | Alessio |
| 7,084,587 B2 | 8/2006 | Archdekin et al. |
| 7,119,499 B2 | 10/2006 | Ishigaki et al. |
| 7,132,805 B2 | 11/2006 | Young |
| 7,162,258 B2 | 1/2007 | Beach et al. |
| 7,180,247 B2 | 2/2007 | Kawarazaki |
| 7,188,967 B2 | 3/2007 | Dalton et al. |
| 7,190,121 B2 | 3/2007 | Rose et al. |
| 7,196,477 B2 | 3/2007 | Richmond |
| 7,218,056 B1 | 5/2007 | Harwood |
| 7,239,087 B2 | 7/2007 | Ball |
| 7,252,385 B2 | 8/2007 | Engle et al. |
| 7,256,554 B2 | 8/2007 | Lys |
| 7,258,464 B2 | 8/2007 | Morris et al. |
| 7,270,441 B2 | 9/2007 | Fiene |
| 7,281,820 B2 | 10/2007 | Bayat et al. |
| 7,290,904 B2 | 11/2007 | Miller |
| 7,294,973 B2 | 11/2007 | Takahama et al. |
| 7,314,291 B2 | 1/2008 | Tain et al. |
| 7,317,403 B2 | 1/2008 | Grootes et al. |
| 7,322,714 B2 | 1/2008 | Barnett et al. |
| 7,330,568 B2 | 2/2008 | Nagaoka et al. |
| 7,339,323 B2 | 3/2008 | Bucur |
| 7,339,471 B1 | 3/2008 | Chan et al. |
| 7,352,138 B2 | 4/2008 | Lys et al. |
| 7,425,777 B2 | 9/2008 | Suzuki |
| 7,429,919 B2 | 9/2008 | Silic et al. |
| 7,438,440 B2 | 10/2008 | Dorogi |
| 7,440,280 B2 | 10/2008 | Shuy |
| 7,445,357 B2 | 11/2008 | Behar et al. |
| 7,468,723 B1 | 12/2008 | Collins |
| 7,518,316 B2 | 4/2009 | Yu |
| 7,524,077 B2 | 4/2009 | Hartman |
| 7,524,089 B2 | 4/2009 | Park |
| 7,538,499 B2 | 5/2009 | Ashdown |
| 7,546,167 B2 | 6/2009 | Walters et al. |
| 7,547,113 B2 | 6/2009 | Lee |
| 7,559,674 B2 | 7/2009 | He et al. |
| 7,564,198 B2 | 7/2009 | Yamamoto et al. |
| 7,578,596 B2 | 8/2009 | Martin |
| 7,578,597 B2 | 8/2009 | Hoover et al. |
| 7,608,948 B2 | 10/2009 | Nearhoof et al. |
| 7,619,539 B2 | 11/2009 | Veskovic et al. |
| 7,623,042 B2 | 11/2009 | Huizenga |
| 7,627,372 B2 | 12/2009 | Vaisnys et al. |
| 7,631,324 B2 | 12/2009 | Buonasera et al. |
| 7,633,463 B2 | 12/2009 | Negru |
| 7,659,676 B2 | 2/2010 | Hwang |
| 7,677,753 B1 | 3/2010 | Wills |
| 7,679,296 B2 | 3/2010 | Kamatani |
| 7,688,002 B2 | 3/2010 | Ashdown et al. |
| 7,697,925 B1 | 4/2010 | Wilson et al. |
| 7,702,135 B2 | 4/2010 | Hill et al. |
| 7,731,383 B2 | 6/2010 | Myer |
| 7,746,003 B2 | 6/2010 | Verfuerth et al. |
| D621,410 S | 8/2010 | Verfuerth et al. |
| D621,411 S | 8/2010 | Verfuerth et al. |
| 7,766,508 B2 | 8/2010 | Villard et al. |
| 7,791,326 B2 | 9/2010 | Dahlman et al. |
| 7,794,457 B2 | 9/2010 | McPherson et al. |
| 7,798,669 B2 | 9/2010 | Trojanowski et al. |
| 7,800,316 B2 | 9/2010 | Haug |
| 7,804,200 B2 | 9/2010 | Flaherty |
| 7,828,463 B1 | 11/2010 | Willis |
| 7,834,922 B2 | 11/2010 | Kurane |
| 7,863,775 B2 | 1/2011 | Oh |
| 7,868,562 B2 | 1/2011 | Salsbury et al. |
| 7,880,394 B2 | 2/2011 | Sibalich et al. |
| 7,919,928 B2 | 4/2011 | Ziegenfuss |
| 7,932,535 B2 | 4/2011 | Mahalingam et al. |
| 7,940,191 B2 | 5/2011 | Hierzer |
| 7,952,609 B2 | 5/2011 | Simerly et al. |
| 7,960,919 B2 | 6/2011 | Furukawa |
| 7,969,121 B2 | 6/2011 | Smith et al. |
| 7,985,005 B2 | 7/2011 | Alexander et al. |
| 7,990,076 B2 | 8/2011 | Van Der Veen et al. |
| 8,033,686 B2 | 10/2011 | Recker et al. |
| 8,061,865 B2 | 11/2011 | Piepgras et al. |
| 8,080,947 B2 | 12/2011 | Chang et al. |
| 8,081,216 B2 | 12/2011 | Cheung et al. |
| 8,100,552 B2 | 1/2012 | Spero |
| 8,118,456 B2 | 2/2012 | Reed et al. |
| 8,120,457 B2 | 2/2012 | Hu et al. |
| 8,135,177 B2 | 3/2012 | Benten |
| 8,143,769 B2 | 3/2012 | Li |
| 8,143,811 B2 | 3/2012 | Shloush et al. |
| 8,149,136 B2 | 4/2012 | Feroldi |
| 8,164,281 B2 | 4/2012 | Warton |
| 8,174,212 B2 | 5/2012 | Tziony et al. |
| 8,183,797 B2 | 5/2012 | McKinney |
| 8,193,717 B2 | 6/2012 | Leiderman |
| 8,203,445 B2 | 6/2012 | Recker et al. |
| 8,207,691 B2 | 6/2012 | Slot et al. |
| 8,207,830 B2 | 6/2012 | Rutjes et al. |
| 8,212,483 B2 | 7/2012 | Reisch |
| 8,279,628 B2 | 10/2012 | Melanson |
| 8,289,248 B2 | 10/2012 | Kunkel |
| 8,290,710 B2 | 10/2012 | Cleland et al. |
| 8,299,722 B2 | 10/2012 | Melanson |
| 8,319,406 B2 | 11/2012 | Radermacher |
| 8,324,840 B2 | 12/2012 | Shteynberg et al. |
| 8,334,640 B2 | 12/2012 | Reed et al. |

(56) References Cited

U.S. PATENT DOCUMENTS

| | | |
|---|---|---|
| 8,344,646 B2 | 1/2013 | Xue et al. |
| 8,376,583 B2 | 2/2013 | Wang et al. |
| 8,378,563 B2 | 2/2013 | Reed et al. |
| 8,395,329 B2 | 3/2013 | Jutras et al. |
| 8,427,076 B2 | 4/2013 | Bourquin et al. |
| 8,432,448 B2 | 4/2013 | Hassapis et al. |
| 8,436,556 B2 | 5/2013 | Eisele et al. |
| 8,457,793 B2 | 6/2013 | Golding et al. |
| 8,508,138 B2 | 8/2013 | Chen et al. |
| 8,522,487 B2 | 9/2013 | Whiting et al. |
| 8,547,022 B2 | 10/2013 | Summerford et al. |
| 8,573,807 B2 | 11/2013 | Borkar et al. |
| 8,593,264 B2 | 11/2013 | Umezawa et al. |
| 8,596,819 B2 | 12/2013 | Negley et al. |
| 8,604,701 B2 | 12/2013 | Verfuerth et al. |
| 8,610,358 B2 | 12/2013 | Reed |
| 8,626,643 B2 | 1/2014 | Verfuerth et al. |
| 8,629,621 B2 | 1/2014 | Reed |
| 8,674,608 B2 | 3/2014 | Holland et al. |
| 8,686,655 B2 | 4/2014 | Setomoto et al. |
| 8,698,646 B2 | 4/2014 | Loveland et al. |
| 8,710,770 B2 | 4/2014 | Woytowitz |
| 8,731,689 B2 | 5/2014 | Platner et al. |
| 8,749,403 B2 | 6/2014 | King et al. |
| 8,749,635 B2 | 6/2014 | Högasten et al. |
| 8,755,039 B2 | 6/2014 | Ramer et al. |
| 8,760,072 B2 | 6/2014 | Josefowicz et al. |
| 8,766,544 B2 | 7/2014 | Velazquez |
| 8,779,686 B2 | 7/2014 | Jin |
| 8,841,865 B2 | 9/2014 | Kim et al. |
| 8,860,322 B2 | 10/2014 | Wei et al. |
| 8,866,322 B2 | 10/2014 | Tchoryk, Jr. et al. |
| 8,866,392 B2 | 10/2014 | Chen |
| 8,872,430 B2 | 10/2014 | Yang |
| 8,872,964 B2 | 10/2014 | Reed et al. |
| 8,878,440 B2 | 11/2014 | Reed |
| 8,890,050 B2 | 11/2014 | Flaherty |
| 8,896,207 B2 | 11/2014 | Thomas et al. |
| 8,896,215 B2 | 11/2014 | Reed et al. |
| 8,901,825 B2 | 12/2014 | Reed |
| 8,922,124 B2 | 12/2014 | Reed et al. |
| 8,922,965 B2 | 12/2014 | Flaherty et al. |
| 8,926,138 B2 | 1/2015 | Reed et al. |
| 8,926,139 B2 | 1/2015 | Reed et al. |
| 8,977,371 B2 | 3/2015 | Ashdown |
| 8,988,005 B2 | 3/2015 | Jungwirth et al. |
| 9,002,108 B2 | 4/2015 | Kubo et al. |
| 9,013,329 B2 | 4/2015 | Rupprath et al. |
| 9,018,851 B1 | 4/2015 | Melanson et al. |
| 9,024,545 B2 | 5/2015 | Bloch et al. |
| 9,030,121 B2 | 5/2015 | Lin et al. |
| 9,084,310 B2 | 7/2015 | Bedell et al. |
| 9,107,026 B1 | 8/2015 | Viswanadham et al. |
| 9,119,270 B2 | 8/2015 | Chen et al. |
| 9,125,261 B2 | 9/2015 | Reed |
| 9,131,552 B2 | 9/2015 | Reed et al. |
| 9,161,419 B2 | 10/2015 | Anderson et al. |
| 9,178,369 B2 | 11/2015 | Partovi |
| 9,185,777 B2 | 11/2015 | Reed |
| 9,204,523 B2 | 12/2015 | Reed et al. |
| 9,210,751 B2 | 12/2015 | Reed |
| 9,210,759 B2 | 12/2015 | Reed |
| 9,241,401 B2 | 1/2016 | Renn et al. |
| 9,253,852 B2 | 2/2016 | Campbell et al. |
| 9,288,873 B2 | 3/2016 | Reed |
| 9,301,365 B2 | 3/2016 | Reed |
| 9,301,460 B2 | 4/2016 | Runge |
| 9,312,451 B2 | 4/2016 | Reed et al. |
| 9,324,924 B2 | 4/2016 | Van De Ven |
| 9,357,618 B2 | 5/2016 | Pandharipande et al. |
| 9,360,198 B2 | 6/2016 | Reed |
| 9,408,280 B2 | 8/2016 | Schröder et al. |
| 9,414,449 B2 | 8/2016 | Reed |
| 9,445,485 B2 | 9/2016 | Reed |
| 9,450,347 B2 | 9/2016 | Kondou et al. |
| 9,462,662 B1 | 10/2016 | Reed |
| 9,465,377 B2 | 10/2016 | Davis et al. |
| 9,466,443 B2 | 10/2016 | Reed |
| 9,474,138 B2 | 10/2016 | Denteneer et al. |
| 9,497,393 B2 | 11/2016 | Reed et al. |
| 9,538,612 B1 | 1/2017 | Reed |
| 9,572,230 B2 | 2/2017 | Reed |
| 9,603,216 B2 | 3/2017 | Radermacher et al. |
| 9,618,162 B2 | 4/2017 | Bendtsen et al. |
| 9,648,074 B2 | 5/2017 | Liu |
| 9,743,473 B2 | 8/2017 | Weaver |
| 9,763,310 B2 | 9/2017 | Dahlen |
| 9,769,895 B2 | 9/2017 | Lenk |
| 9,835,691 B2 | 12/2017 | Trainor et al. |
| 9,924,582 B2 | 3/2018 | Vendetti et al. |
| 9,930,758 B2 | 3/2018 | Jayawardena et al. |
| 9,955,547 B2 | 4/2018 | Taipale et al. |
| 9,961,731 B2 | 5/2018 | Reed |
| 9,985,429 B2 | 5/2018 | Reed |
| 10,009,983 B2 | 6/2018 | Noesner |
| 10,098,212 B2 | 10/2018 | Vendetti et al. |
| 10,219,338 B2 | 2/2019 | Harris |
| 10,219,360 B2 | 2/2019 | Vendetti et al. |
| 10,230,296 B2 | 3/2019 | Reed |
| 10,237,950 B2 | 3/2019 | Flinsenberg et al. |
| 10,342,101 B2 | 7/2019 | Cook |
| 10,433,382 B2 | 10/2019 | Kottritsch et al. |
| 10,485,069 B2 | 11/2019 | Seki et al. |
| 10,531,537 B2 | 1/2020 | Reed |
| 10,932,343 B2 | 2/2021 | Reed et al. |
| 11,019,703 B2 | 5/2021 | Reed |
| 2003/0007074 A1 | 1/2003 | Nagaoka et al. |
| 2003/0016143 A1 | 1/2003 | Ghazarian |
| 2003/0184672 A1 | 10/2003 | Wu et al. |
| 2004/0015289 A1 | 1/2004 | Poland et al. |
| 2004/0184272 A1 | 9/2004 | Wright et al. |
| 2004/0187426 A1 | 9/2004 | Callahan |
| 2004/0206970 A1 | 10/2004 | Martin |
| 2006/0014118 A1 | 1/2006 | Utama |
| 2006/0098440 A1 | 5/2006 | Allen |
| 2006/0146652 A1 | 7/2006 | Huizi et al. |
| 2006/0175985 A1 | 8/2006 | Huynh et al. |
| 2006/0208169 A1 | 9/2006 | Breed et al. |
| 2006/0238136 A1 | 10/2006 | Johnson, III et al. |
| 2007/0102033 A1 | 5/2007 | Petrocy |
| 2007/0225933 A1 | 9/2007 | Shimomura |
| 2008/0018261 A1 | 1/2008 | Kastner |
| 2008/0025020 A1 | 1/2008 | Kolb |
| 2008/0130304 A1 | 6/2008 | Rash et al. |
| 2008/0232116 A1 | 9/2008 | Kim |
| 2008/0266839 A1 | 10/2008 | Claypool et al. |
| 2008/0304284 A1 | 12/2008 | Guo et al. |
| 2009/0058320 A1 | 3/2009 | Chou et al. |
| 2009/0195162 A1 | 8/2009 | Maurer et al. |
| 2009/0195179 A1 | 8/2009 | Joseph et al. |
| 2009/0235208 A1 | 9/2009 | Nakayama et al. |
| 2009/0268023 A1 | 10/2009 | Hsieh |
| 2009/0309500 A1* | 12/2009 | Reisch .................. B60Q 1/1423 315/158 |
| 2010/0001652 A1 | 1/2010 | Damsleth |
| 2010/0096460 A1 | 4/2010 | Carlson et al. |
| 2010/0109537 A1 | 5/2010 | Nishino et al. |
| 2010/0148677 A1* | 6/2010 | Melanson ............... H05B 45/22 315/154 |
| 2010/0171442 A1* | 7/2010 | Draper .................. H05B 47/175 315/297 |
| 2010/0237711 A1 | 9/2010 | Parsons |
| 2010/0246168 A1 | 9/2010 | Verfuerth et al. |
| 2010/0309310 A1 | 12/2010 | Albright |
| 2011/0001626 A1 | 1/2011 | Yip et al. |
| 2011/0006703 A1 | 1/2011 | Wu et al. |
| 2011/0026264 A1 | 2/2011 | Reed et al. |
| 2011/0204845 A1 | 8/2011 | Paparo et al. |
| 2011/0215724 A1 | 9/2011 | Chakravarty et al. |
| 2011/0215731 A1 | 9/2011 | Jeong et al. |
| 2011/0251751 A1 | 10/2011 | Knight |
| 2012/0001997 A1 | 1/2012 | Takada |
| 2012/0139426 A1 | 6/2012 | Ilyes et al. |
| 2012/0146518 A1 | 6/2012 | Keating et al. |

(56) References Cited

U.S. PATENT DOCUMENTS

| | | | |
|---|---|---|---|
| 2012/0194054 A1 | 8/2012 | Johnston et al. | |
| 2012/0206050 A1* | 8/2012 | Spero | H05B 47/11 |
| | | | 315/152 |
| 2012/0299492 A1 | 11/2012 | Egawa et al. | |
| 2013/0015783 A1 | 1/2013 | Herbst | |
| 2013/0026927 A1 | 1/2013 | Uhara | |
| 2013/0057158 A1 | 3/2013 | Josefowicz et al. | |
| 2013/0154488 A1 | 6/2013 | Sadwick et al. | |
| 2013/0169189 A1 | 7/2013 | Bernard | |
| 2013/0210252 A1 | 8/2013 | Ilyes | |
| 2013/0235202 A1 | 9/2013 | Nagaoka et al. | |
| 2014/0055990 A1 | 2/2014 | Reed | |
| 2014/0128941 A1* | 5/2014 | Williams | H05B 45/46 |
| | | | 607/88 |
| 2015/0160305 A1 | 6/2015 | Ilyes et al. | |
| 2015/0280782 A1 | 10/2015 | Airbinger et al. | |
| 2016/0113084 A1 | 4/2016 | White et al. | |
| 2016/0195434 A1* | 7/2016 | Roberts | G01J 1/0488 |
| | | | 250/338.1 |
| 2016/0234899 A1 | 8/2016 | Reed et al. | |
| 2017/0055324 A1 | 2/2017 | Reed | |
| 2017/0164439 A1* | 6/2017 | Reed | F21V 9/20 |
| 2018/0352627 A1* | 12/2018 | Seki | H05B 45/37 |

FOREIGN PATENT DOCUMENTS

| | | |
|---|---|---|
| EP | 2320713 A2 | 5/2011 |
| FR | 2883306 A1 | 9/2006 |
| JP | 6335241 A2 | 12/1994 |
| JP | 2001333420 A | 11/2001 |
| JP | 2004279668 A | 10/2004 |
| JP | 2004349065 A | 12/2004 |
| JP | 2005078403 A | 3/2005 |
| JP | 2006244711 A | 9/2006 |
| JP | 2008159483 A | 7/2008 |
| JP | 4385694 B2 | 12/2009 |
| JP | 4720100 B2 | 7/2011 |
| KR | 100660186 B1 | 12/2006 |
| KR | 20090042400 A | 4/2009 |
| KR | 100935736 B1 | 1/2010 |
| KR | 20100007230 A | 1/2010 |
| KR | 101001276 B1 | 12/2010 |
| KR | 101044224 B1 | 6/2011 |
| KR | 101150876 B1 | 5/2012 |
| WO | 02076068 A1 | 9/2002 |
| WO | 03055273 A2 | 7/2003 |
| WO | 10133719 A1 | 11/2010 |
| WO | 14134850 A1 | 9/2014 |

OTHER PUBLICATIONS

EE Herald, "Devices to protect High brightness LED from ESD," dated Mar. 16, 2009, retrieved Jun. 10, 2011, from http://www.eeherald.com/section/new-products/np100779.html, 1 page.

Fairchild Semiconductor, "LED Application Design Guide Using Half-Bridge LLC Resonant Converter for 100W Street Lighting," AN-9729, Fairchild Semiconductor Corporation, Rev. 1.0.0, Mar. 22, 2011, 17 pages.

Huang, "Designing an LLC Resonant Half-Bridge Power Converter," 2010 Texas Instruments Power Supply Design Seminar, SEM1900, Topic 3, TI Literature No. SLUP263, Copyright 2010, 2011, Texas Instruments Incorporated, 28 pages.

Kadirvel et al., "Self-Powered, Ambient Light Sensor Using bq25504," Texas Instruments, Application Report, SLUA629—Jan. 2012, 6 pages.

Littelfuse, "Application Note: Protecting LEDs in Product Designs," 2009, 2 pages.

Panasonic Electronic Components, "LED Lighting Solutions," 2009, 6 pages.

Renesas Electronics, "Zener Diodes for Surge Absorption—Applications of high-intensity LED," Apr. 2010, 1 page.

Tyco Electronics, "Circuit Protection," retrieved Jun. 10, 2011, retrieved from http://www.tycoelectronics.com/en/products/circuit-protection.html, 2 pages.

Vendetti et al., "Luminaire Dimming Module Uses 3 Contact NEMA Photocontrol Socket," U.S. Appl. No. 15/496,985, filed Apr. 25, 2017, 23 pages.

* cited by examiner

FIGURE 2 – LIGHT SENSOR LEVELS

| CURRENT STATE | NEW LIGHT LEVEL READING | | | |
|---|---|---|---|---|
| | BRIGHT | LIGHT GRAY | DARK GRAY | DARK |
| STABLE DAY | SIGNAL DAY | SIGNAL DAY | SIGNAL NIGHT STATE=>NEWLY NIGHT | SIGNAL NIGHT STATE=>STABLE NIGHT |
| NEWLY NIGHT | SIGNAL DAY STATE=>STABLE DAY | SIGNAL NIGHT | SIGNAL NIGHT | SIGNAL NIGHT STATE=>STABLE NIGHT |
| NEWLY DAY | SIGNAL DAY STATE=>STABLE DAY | SIGNAL DAY | SIGNAL DAY | SIGNAL NIGHT STATE=>STABLE NIGHT |
| STABLE NIGHT | SIGNAL DAY STATE=>STABLE DAY | SIGNAL DAY STATE=>NEWLY DAY | SIGNAL NIGHT | SIGNAL NIGHT |

FIG.7

PHOTOCONTROLLER AND/OR LAMP WITH PHOTOCONTROLS TO CONTROL OPERATION OF LAMP

TECHNICAL FIELD

The present application is directed to a photocontroller and/or a lamp with photocontrols operable to control operation of the lamp.

BACKGROUND

Description of the Related Art

Conventional photocontrollers (commonly referred to as "photocontrols") for many types of outdoor luminaires require a window or other optical port to detect ambient daylight. This is because the luminaire produces light in the visible spectrum which may reflect off of the interior transparent surfaces of the sealed lens, or light output window, and represent a light level higher than the ambient light during the day or night. This, along with a high light level produced by the light output of the luminaire, may cause the ambient light detector to be unable to detect the low ambient light level at near dawn, or even the light level during the daytime, and cannot therefore turn off the luminaire during the day as desired.

Typically, a luminaire will be turned on by a photocontroller at night and turned off during the day. In a conventional photocontroller, a relay in the photocontroller switches power to the luminaire. In some cases, such as the AreaMax™ luminaires from Evluma (Renton, Wash.), software periodically reads a voltage output by the photocontroller and outputs a signal to other software elements which control the luminaire indicating whether it is day or night. In dusk or dawn (i.e., twilight) periods, the ambient light level may fluctuate due to environmental conditions (e.g., wind, clouds, other luminaires, car headlights, etc.). This may cause the luminaire to flicker and/or repeatedly turn on and off due to fluctuating light levels.

BRIEF SUMMARY

Disclosed embodiments provide a photocontroller for a lamp which is to be installed in the light emitting chamber (i.e., refractor or lens) of a luminaire and which can measure the outside ambient light at dawn, daytime, dusk, and nighttime levels without substantial interference from the light produced by the lamp and without the need for an external window for receiving light, e.g., a window positioned on the exterior of the luminaire.

In disclosed embodiments, a photodiode, phototransistor, photo-integrated circuit, or other photosensor, is positioned such that light from outside of the luminaire falls upon a sensitive area of the photosensor. In disclosed embodiments, the photosensor is specifically sensitive to light wavelengths longer than the longest wavelength output by the light source of the luminaire and/or has an optical filter to absorb and/or reflect the shorter wavelengths. In disclosed embodiments, the photosensor, with or without an optical filter, may be sensitive to light wavelengths shorter than the short wavelength of light emitted by the lamp, or longer than the long wavelength of light emitted by the lamp.

In disclosed embodiments, software of the photocontroller or luminaire may provide a state machine to determine the output signal during dusk and dawn periods to prevent the luminaire from flickering or repeatedly turning on and off due to fluctuating light levels.

In other disclosed embodiments the photosensor may output values of a light level signal, e.g., based on an output voltage level, which are stored in memory for some period of time and used to compute the solar time of day. The computed time of day may be used to recalibrate a real time clock (RTC) circuit, or RTC software algorithm, within the luminaire. The recalibrating of the RTC is to account for long-term drift in the RTC and/or to re-establish the local time-of-day after a power failure. The RTC time is used by software, such as FailSafe™ from Evluma, to control the light output of the luminaire in the event of the failure of an external primary photocontroller. The photosensor and/or the microcontroller may calibrate a RTC, realized in hardware or software, to enable operation of software in the luminaire which continues proper day/night control and/or scheduled dimming of the light output, e.g., in the event of power failure or failure of the photocontroller, without requiring the use of a battery.

A photocontroller, for use with a luminaire and one or more solid state light sources that cumulatively emit light across an emitted light band of wavelengths, may be summarized as including at least one photosensor positioned to detect light in an external environment that is external to the luminaire and responsive primarily to wavelengths of light outside the emitted light band of wavelengths that the solid state light source emit and which produces a light level signal representative of a level of light in the external environment primarily for wavelengths outside of the emitted light band of wavelengths; and a microcontroller communicatively coupled to the at least one photosensor to receive the light level signal representative of a level of light in the external environment primarily for wavelengths outside of the emitted light band of wavelengths, the microcontroller operable to determine an external light condition based at least in part on the light level signal and to produce a control signal to control an operation of the one or more solid state light sources based at least in part on the determination of the external light condition.

The photocontroller may further include the microcontroller being operable to compute a time of day based at least in part on the light level signal; recalibrate a real time clock of the luminaire based on the computed time of day; and use the real time clock to control operation of the one or more solid state light sources in an event of failure of the photocontroller.

A lamp for use in a luminaire may be summarized as including a housing having an exterior, an interior, and a base to communicatively couple to a socket of the luminaire; one or more solid state light sources that cumulatively emit light across an emitted light band of wavelengths; and a photocontroller to control operation of the one or more solid state light sources, the photocontroller having a set of circuitry housed in the interior of the housing, the set of circuitry including: at least one photosensor positioned to detect light in an external environment that is external to the luminaire and responsive primarily to wavelengths of light outside the emitted light band of wavelengths that the solid state light source emit and which produces a light level signal representative of a level of light in the external environment for wavelengths primarily outside of the emitted light band of wavelengths, and a microcontroller operably coupled to the at least one photosensor to receive the light level signal representative of a level of light in the external environment for wavelengths primarily outside of the emitted light band of wavelengths, the microcontroller operable to select an operating mode of the luminaire based at least in part on the light level signal and to produce a control signal to control an operation of the one or more solid state light sources based at least in part on the selected operating mode of the photocontroller.

A method of operation of a photocontroller, for use with a luminaire and one or more solid state light sources that cumulatively emit light across an emitted light band of wavelengths, the photocontroller including at least one photosensor positioned to detect light in an external environment that is external to the luminaire and responsive primarily to wavelengths of light outside the emitted light band of wavelengths that the solid state light source emit, and a microcontroller communicatively coupled to the at least one photosensor. The method may be summarized as including: producing, by the at least one photosensor, a light level signal representative of a level of light in the external environment primarily for wavelengths outside of the emitted light band of wavelengths; receiving, by the microcontroller, the light level signal representative of a level of light in the external environment primarily for wavelengths outside of the emitted light band of wavelengths; selecting an operating mode of the luminaire based at least in part on the light level signal representative of a level of light in the external environment primarily for wavelengths outside of the emitted light band of wavelengths; and producing a control signal to control an operation of the one or more solid state light sources based at least in part on the selected operating mode of the photocontroller.

The method may further include, in the selecting of the operating mode of the photocontroller based at least in part on the light level signal representative of the level of light in the external environment primarily for wavelengths outside of the emitted light band of wavelengths, determining, by the microcontroller, a current light sensor level category based at least in part on the light level signal representative of the level of light in the external environment primarily for wavelengths outside of the emitted light band of wavelengths; retrieving, from the memory of the microcontroller, a current designated temporal state from a set of defined temporal states; selecting the operating mode of the photocontroller based at least in part on the current light sensor level category and the current designated temporal state from a set of defined temporal states; and determining, and storing in the memory of the microcontroller, a subsequent designated temporal state, from the set of defined temporal states, based at least in part on the current light sensor level category and the current designated temporal state from the set of defined temporal states.

The method may further include computing a time of day based at least in part on the light level signal; recalibrating a real time clock of the luminaire based on the computed time of day; and using the real time clock to control operation of the one or more solid state light sources in an event of failure of the photocontroller.

A method of operation of a system to control one or more solid state light sources that cumulatively emit light across an emitted light band of wavelengths when in an ON state, the system comprising at least one photosensor responsive primarily to wavelengths of light outside the emitted light band of wavelengths that the one or more solid state light sources emit when the one or more solid state light sources are in the ON state and a set of circuitry communicatively coupled to the at least one photosensor to receive the light level signal representative of the sensed level of light. The method may be summarized as including: producing, by the at least one photosensor, a light level signal representative of a level of sensed light primarily for wavelengths outside of the emitted light band of wavelengths; determining, by the set of circuitry, a contribution by the one or more solid state light sources to the sensed level of light as sensed by the at least one photosensor; and assessing, by the set of circuitry, using a compensated light level or a compensated threshold, at least one of a dusk condition or a dawn condition when the solid state light sources are in the ON state, where the compensated light level or the compensated threshold compensate for the contribution by the one or more solid state light sources to the sensed level of light as sensed by the at least one photosensor.

The method may further include assessing, by the set of circuitry, using an uncompensated light level or an uncompensated threshold, at least one of the dusk condition or the dawn condition when the solid state light sources are in the OFF state. In the determining the contribution by the one or more solid state light sources to the sensed level of light as sensed by the at least one photosensor, the method further include comparing, by the set of circuitry, a level of light sensed during a first period of time in at least one diurnal cycle with the solid state lights sources in the ON state with a level of light sensed during a same period of time as the first period of time in at least one diurnal cycle with the solid state light sources in an OFF state. In the determining the contribution by the one or more solid state light sources to the sensed level of light as sensed by the at least one photosensor, the method further include: storing, by the set of circuitry, a plurality of values that represent a respective level of light sensed when the solid state lights sources are in the ON state; comparing a level of light sensed when the solid state lights sources are in the ON state with a level of light sensed when the solid state light sources are in an OFF state; and storing at least one value that represents the contribution by the one or more solid state light sources to the sensed level of light as sensed by the at least one photosensor. The method may further include subtracting, by the set of circuitry, from the sensed level of light the stored value that represents the contribution by the one or more solid state light sources to the sensed level of light as sensed by the at least one photosensor. The method may further include increasing, by the set of circuitry, at least one of a dusk threshold or a dawn threshold by the stored value that represents of the contribution by the one or more solid state light sources to the sensed level of light as sensed by the at least one photosensor.

A method of operation of a photocontroller for use with a luminaire and one or more solid state light sources that cumulatively emit light across an emitted light band of wavelengths, the photocontroller comprising at least one photosensor positioned to detect light in an external environment that is external to the luminaire and responsive primarily to wavelengths of light outside the emitted light band of wavelengths that the solid state light source emit, and a microcontroller communicatively coupled to the at least one photosensor. The method may be summarized as including: producing, by the at least one photosensor, a light level signal representative of a level of light in the external environment primarily for wavelengths outside of the emitted light band of wavelengths; receiving, by the microcontroller, the light level signal representative of a level of light in the external environment primarily for wavelengths outside of the emitted light band of wavelengths; periodically storing in memory, by the microcontroller, a value of the light level signal received while the one or more solid state light sources are in a first state, the first state being one of an OFF state and an ON state; determining a visible light correction value by computing a difference between the periodically stored value of the light level signal received while the one or more solid state light sources are in the first state and a value of the light level signal received while the one or more solid state light sources are in a second state, the second state being an opposite one of the OFF state and the ON state; selecting an operating mode of the photocontroller based at least in part on the light level signal representative of the level of light in the external environment primarily for wavelengths outside of the emitted light band of wavelengths and the determined visible light correction value; and producing a control signal to control an operation of the one or more solid state light sources based at least in part on the selected operating mode of the photocontroller.

The method may further include, in the selecting of the operating mode of the photocontroller based at least in part on the light level signal representative of the level of light in the external environment primarily for wavelengths outside of the emitted light band of wavelengths and the determined visible light correction value: determining, by the microcontroller, a corrected light level signal by subtracting the determined visible light correction value from the light level signal representative of the level of light in the external environment primarily for wavelengths outside of the emitted light band of wavelengths; determining, by the microcontroller, a current light sensor level category based at least in part on: (i) the light level signal representative of the level of light in the external environment primarily for wavelengths outside of the emitted light band of wavelengths, while the one or more solid state light sources are in the OFF state; and (ii) the corrected light level signal, while the one or more solid state light sources are in the ON state; retrieving, from the memory of the microcontroller, a current designated temporal state from a set of defined temporal states; selecting the operating mode of the photocontroller based at least in part on the current light sensor level category and the current designated temporal state from a set of defined temporal states; and determining, and storing in the memory of the microcontroller, a subsequent designated temporal state, from the set of defined temporal states, based at least in part on the current light sensor level category and the current designated temporal state from the set of defined temporal states.

The method may further include, in the selecting of the operating mode of the photocontroller based at least in part on the light level signal representative of the level of light in the external environment primarily for wavelengths outside of the emitted light band of wavelengths and the determined visible light correction value: determining a set of corrected light level threshold values by adding the determined visible light correction value to a set of light level threshold values stored in the memory of the photocontroller; determining, by the microcontroller, a current light sensor level category based at least in part on comparing the light level signal representative of the level of light in the external environment primarily for wavelengths outside of the emitted light band of wavelengths to: (i) the set of light level threshold values stored in the memory of the photocontroller, while the one or more solid state light sources are in the OFF state; and (ii) the set of corrected light level threshold values, while the one or more solid state light sources are in the ON state; retrieving, from the memory of the microcontroller, a current designated temporal state from a set of defined temporal states; selecting the operating mode of the photocontroller based at least in part on the current light sensor level category and the current designated temporal state from a set of defined temporal states; and determining, and storing in the memory of the microcontroller, a subsequent designated temporal state, from the set of defined temporal states, based at least in part on the current light sensor level category and the current designated temporal state from the set of defined temporal states.

The method may further include wherein said periodic storing in memory, by the microcontroller, of the value of the light level signal received while the one or more solid state light sources are in the first state is performed only if there has been at least one instance, within a preceding 24 hours, of the microcontroller changing the one or more solid state light sources from the first state to the second state, or the second state to the first state.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn, are not necessarily intended to convey any information regarding the actual shape of the particular elements, and have been solely selected for ease of recognition in the drawings.

FIG. 7 is a table representing operation of the software state machine, according to at least one illustrated implementation.

DETAILED DESCRIPTION

Disclosed embodiments provide a photocontroller for a lamp which is to be installed inside a globe (i.e., refractor or lens) of a luminaire. The photocontroller can measure outside ambient light levels as they change from daytime to nighttime, and vice versa, and provide a stable day or night control signal without substantial interference from the light produced by the luminaire. The lamp may include one or more lights sources, e.g., solid state light sources, such as light emitting diodes (LED). The lamp may be used to replace a high intensity discharge (HID) lamp, or similar lamp, to retrofit an existing decorative outdoor luminaire.

In disclosed embodiments, software of the photocontroller may provide a state machine to determine the day/night control signal during dusk and dawn periods to prevent the luminaire from flickering and/or repeatedly turning on and off due to ephemeral fluctuations in light levels. An aspect of the state machine is that once the day/night control signal has changed (e.g., from day to night or vice versa), no further control signal changes will occur until the light level has moved outside a twilight light level range associated with periods in which night time light conditions transition into day time light conditions (i.e., dawn) and day time light conditions transition into night time light conditions (i.e., dusk). The light levels defined as dusk and dawn may be set using threshold values determined based on, for example, desired lighting characteristics for a particular lighting use or installed environment.

Figure 1:
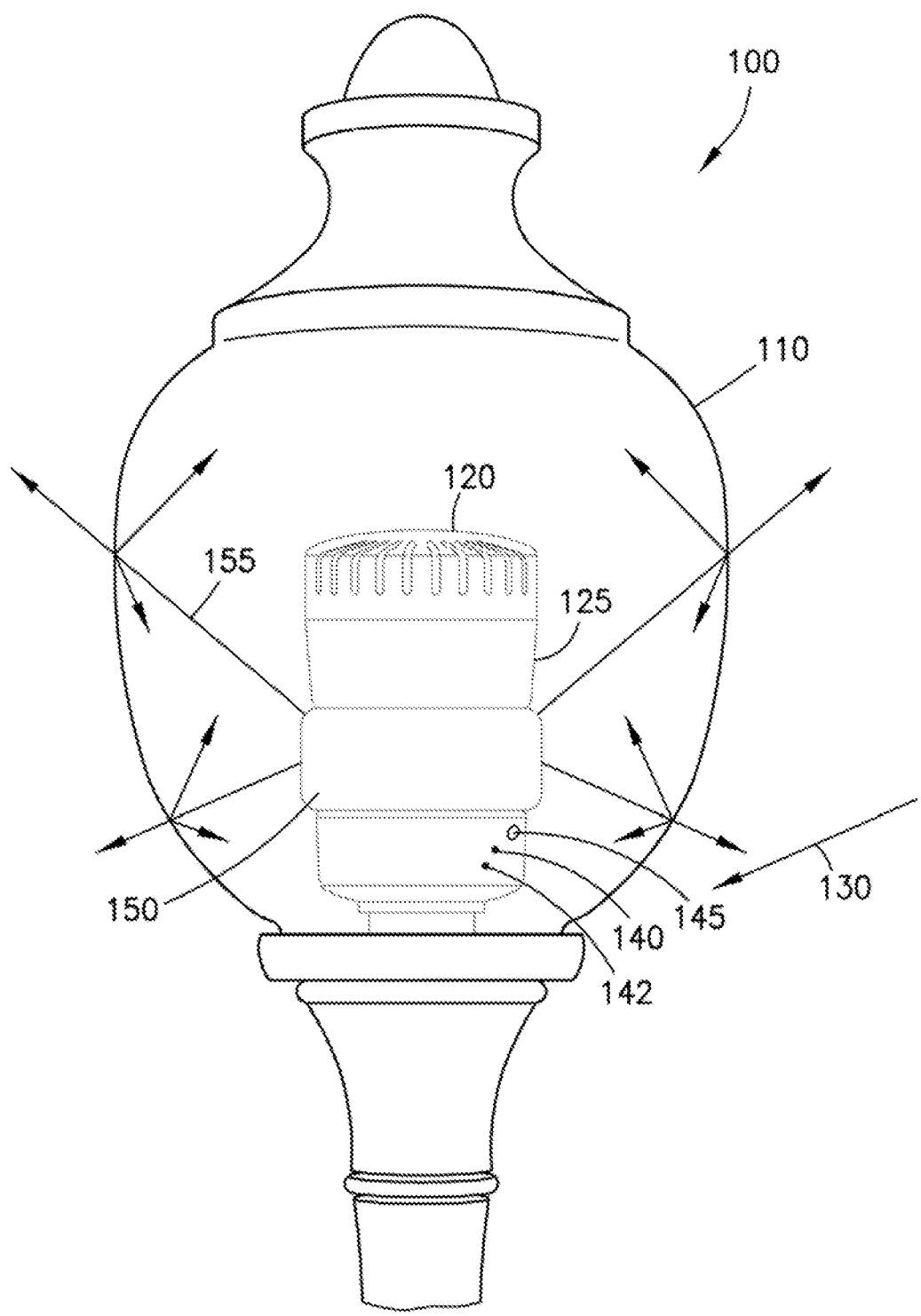
FIG. 1 shows a decorative luminaire with a diffusing globe in which a screw-in retrofit lamp is installed, according to at least one illustrated implementation.

FIG. 1 shows a decorative luminaire 100 with a diffusing globe 110 (i.e., refractor) in which a lamp 120 having a self-contained housing 125 is installed. The lamp may be shaped and sized, and may have some components in common with, e.g., an Evluma (Renton, Wash.) OmniMax™ LED decorative luminaire replacement lamp, which is an omnidirectional LED replacement lamp for high-intensity discharge (HID) decorative outdoor light fixtures. In implementations, the lamp 120 emulates the light center and pattern of a legacy HID bulb. A lamp 120 of this type may be an easy to install, screw-in lamp which is self-ballasted and which provides energy and maintenance savings.

In implementations, incoming ambient light 130 having longer wavelengths passes through the glass or plastic globe 110 and strikes a longer-wavelength ambient light sensor 140 via a port 145 (e.g., an opening covered with a plastic lens) in the housing 125. The lamp 120 may have an arrangement of LED sources 150 (which may encircle the cylindrically-shaped housing 125 and which may be covered by a translucent window) having relatively shorter wavelengths. The light 155 emitted by the LED sources 150 undergoes internal reflections in the globe 110 and also illuminates the longer-wavelength ambient light sensor 140 via the port 145 but is not detected by the ambient light sensor 140, as explained in further detail below.

Figure 2:
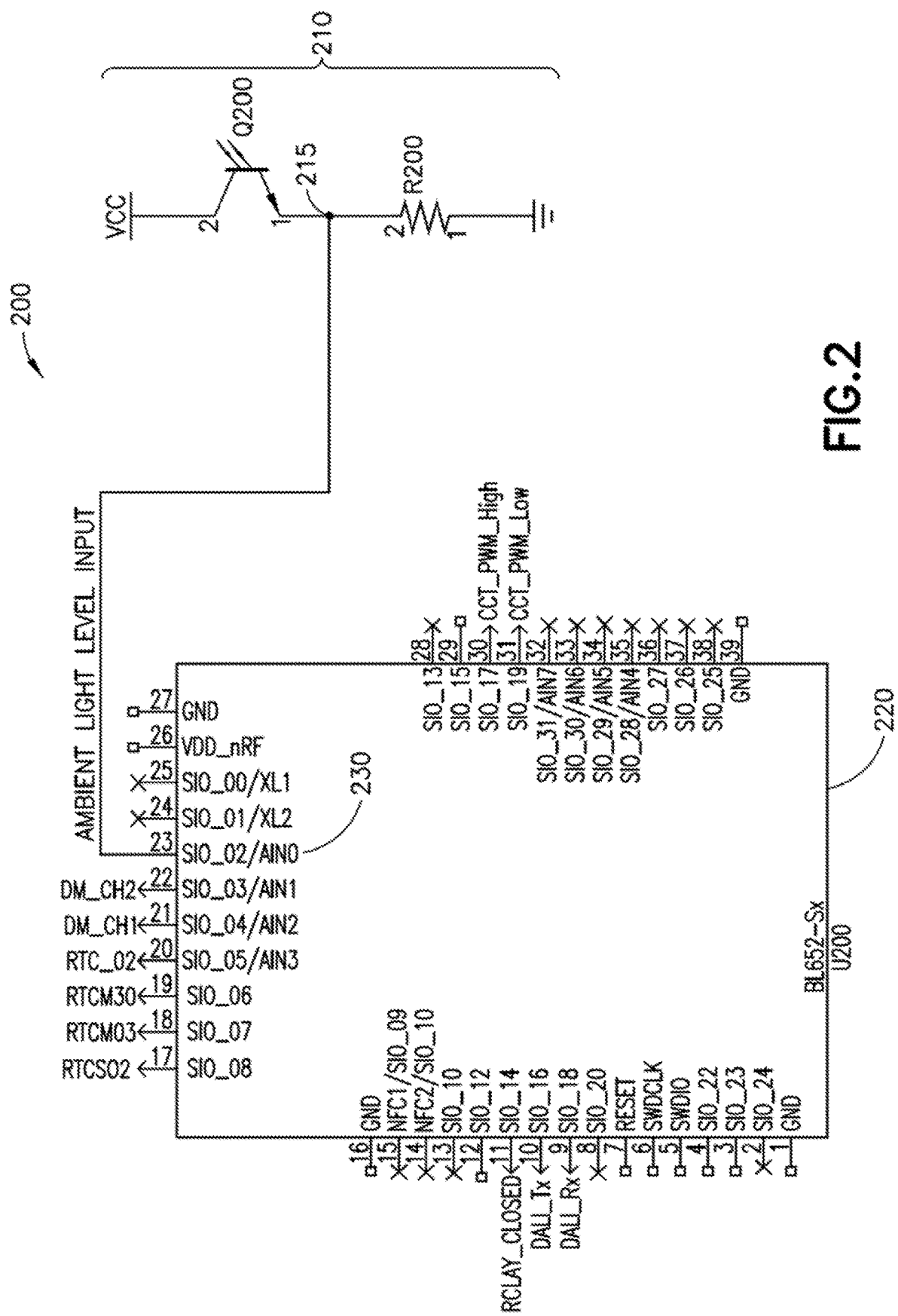
FIG. 2 shows a circuit diagram of a photocontroller which includes a photosensor and a microcontroller, according to at least one illustrated implementation.

FIG. 2 shows a circuit diagram of a photocontroller 200 which includes a photosensor 210 and a microcontroller 220. In implementations, the photosensor 210 may be a phototransistor Q200 with a visible light blocking filter, e.g., the SML-810 TB reverse mount type phototransistor (Rohm Co., Ltd.). The phototransistor Q200 serves as a main component of the photosensor 210 by outputting a current from its source in response to received ambient light. There may be more than one photosensor 210 in particular embodiments. The source of the phototransistor Q200 is connected to ground through a bias resistor R200, thereby producing an output voltage at the junction 215 of the source of the phototransistor Q200 and the resistor R200. The voltage output of the phototransistor Q200 is higher in response to higher ambient light levels and is also higher in a particular frequency range, e.g., in the 750 nm to 1100 nm wavelength range.

In implementations, the at least one photosensor 210 is positioned to detect ambient light 130 (see FIG. 1), i.e., light in an environment that is external to the luminaire 100. For example, the at least one photosensor 210 may be positioned at or near a port 145 in the housing 125 of the lamp 120—the photocontroller 200 circuitry being contained within the lamp housing 125—to detect ambient light 130 which passes through the globe 110 of the luminaire 100 from the external environment, i.e., the environment outside the globe 110 of the luminaire 100. In alternative embodiments, the at least one photosensor 210 may be positioned on the exterior of the lamp housing 125—or elsewhere within the globe 110—so that a port 145 is not required. For example, the at least one photosensor 210 may be positioned on an appendage or surface extending from the lamp 120. As explained in further detail below, the at least one photosensor 210 may be responsive primarily to wavelengths of light outside the emitted light band of wavelengths that the solid state light sources emit, e.g., LED sources 150, and may produce a light level signal representative of a level of light in the external environment primarily for wavelengths outside of the emitted light band of wavelengths.

In implementations, the phototransistor Q200 may form part of a set of light level detection circuitry, which may include one or more processors, for example the microcontroller 220 depicted in FIG. 2 (or a microprocessor) with an analog or digital interface to the photosensor 210, and firmware processor-executable instructions or data stored on one or more non-transitory processor-readable media. The microcontroller 220 may be implemented as a single integrated circuit, with one or more of the following features: a central processing unit (CPU), volatile memory, e.g., random access memory (RAM), for data storage, read-only memory (ROM) for program and operating parameter storage, serial input/output such as serial ports (UARTs), analog-to-digital converters, digital-to-analog converters, and in-circuit programming and debugging support. Thus, the microcontroller 220 may be considered to be a microprocessor or CPU integrated with various other functionalities. One of ordinary skill in the art would understand that the functions of the microcontroller 220 could be performed by a single microcontroller chip or by a microcontroller or microprocessor in conjunction with one or more communicatively-coupled chips and/or sets of circuitry.

Execution of the firmware processor-executable instructions or data may cause the microcontroller 220 to determine, inter alia, if light detected in the ambient environment is above or below one or more light level thresholds. In embodiments, the photosensor 210 may include a solid state device, such as, for example, a photodiode, a phototransistor, or other photo-sensitive semiconductors, with or without amplifier circuitry, to produce voltage or current levels to be compared to the one or more thresholds. In embodiments, the photosensor 210 may use filtered cadmium sulfide photoresistors.

Figure 3:
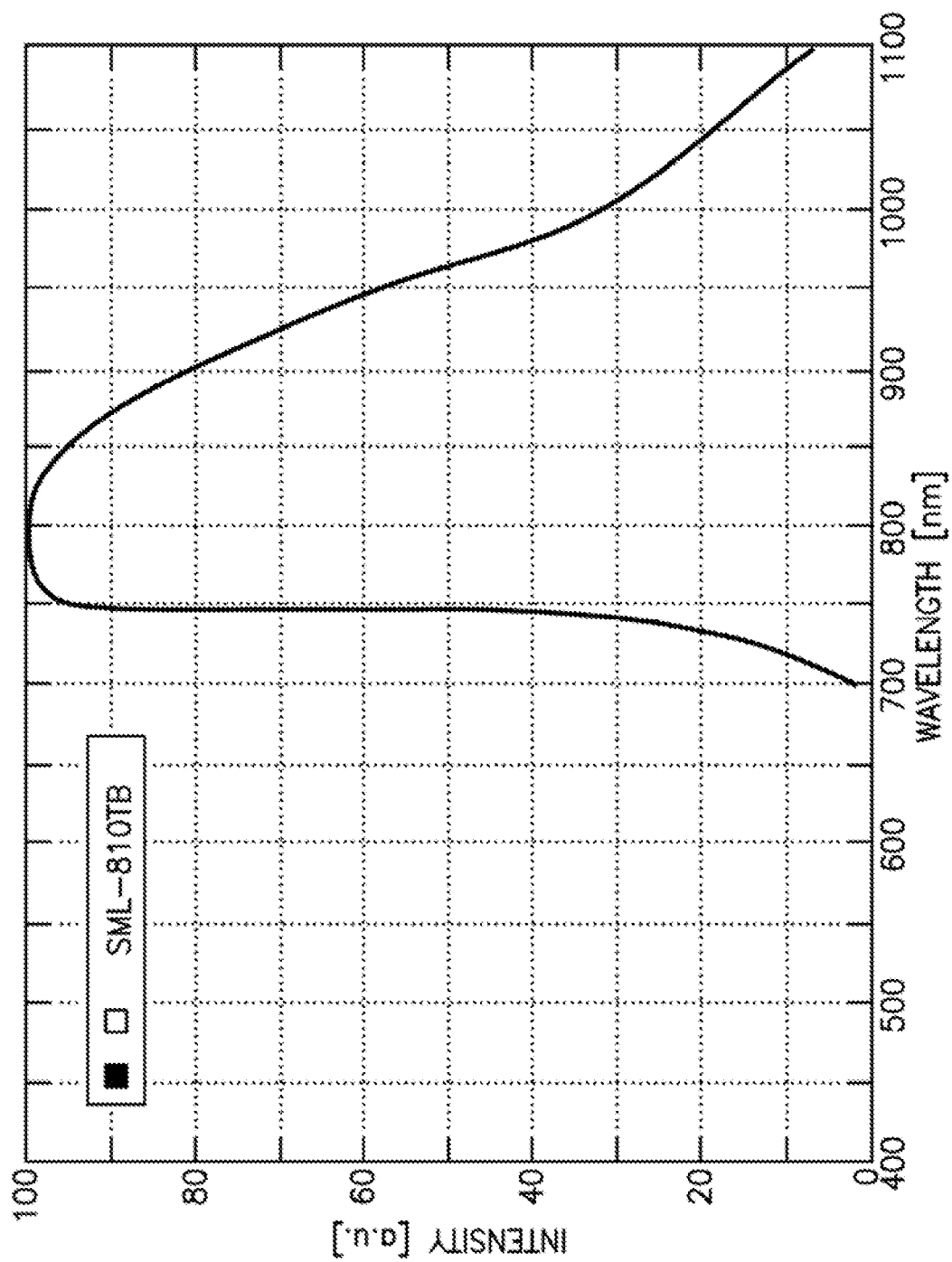
FIG. 3 is a plot of a photosensor responsivity spectrum, according to at least one illustrated implementation.

FIG. 3 is an example plot of a photosensor responsivity spectrum for the phototransistor Q200 which shows that the phototransistor Q200 is primarily sensitive to a range of longer wavelengths, e.g., longer than wavelengths emitted by the LED sources 150. Specifically, the phototransistor Q200 has a responsivity range with a lower cutoff at about 750 nm such that, below that wavelength, the relative intensity of the photosensor responsivity (plotted in FIG. 3 in arbitrary units [a. u.]) drops off sharply. The precise cutoff wavelength is not important for proper performance of the photocontroller, as discussed in further detail below. In implementations, the photo sensor may have an associated, or built-in, optical filter to produce the cutoff in the responsivity spectrum. In particular embodiments, a photosensor may have higher sensitivity to longer wavelength light due to its internal characteristics, without the addition of an external optical filter.

In implementations, the lower cutoff wavelength may be determined by referring to a specification sheet for the particular photosensor or by considering a range on the photosensor responsivity spectrum in which the relative intensity is at about 50% or more of its peak. In the example depicted in FIG. 3, a wavelength of about 750 nm can be deemed the lower cutoff wavelength of the range. Based on this determination, it may be said that the photosensor is primarily responsive to wavelengths greater than about 750 nm. Therefore, the photosensor is responsive primarily to wavelengths of light outside the emitted light band of wavelengths that the solid state light source emit, as discussed in further detail below.

As a practical matter, given the sharp cutoff of the responsivity spectrum, there may be implementations in which the relative intensity at a wavelength below about 750 nm, e.g., 749 nm, may be high (e.g., greater than about 50%) if, for example, the actual responsivity spectrum were to be shifted downward in wavelength by about 1 nm from the example depicted. However, such a shift would not have a significant effect on performance of the photocontroller because the light intensity output by the solid state light sources typically has a relatively gradual downward slope in this wavelength region (see discussion of FIG. 4). Alternatively, if the light intensity output by the solid state light sources were to have a sharp cutoff, it would be selected to be sufficiently separated in wavelength from the cutoff wavelength of the photosensor to avoid detection of a significant amount of light from the solid state light sources by the photosensor (e.g., an intensity greater than about 50%).

Figure 4:
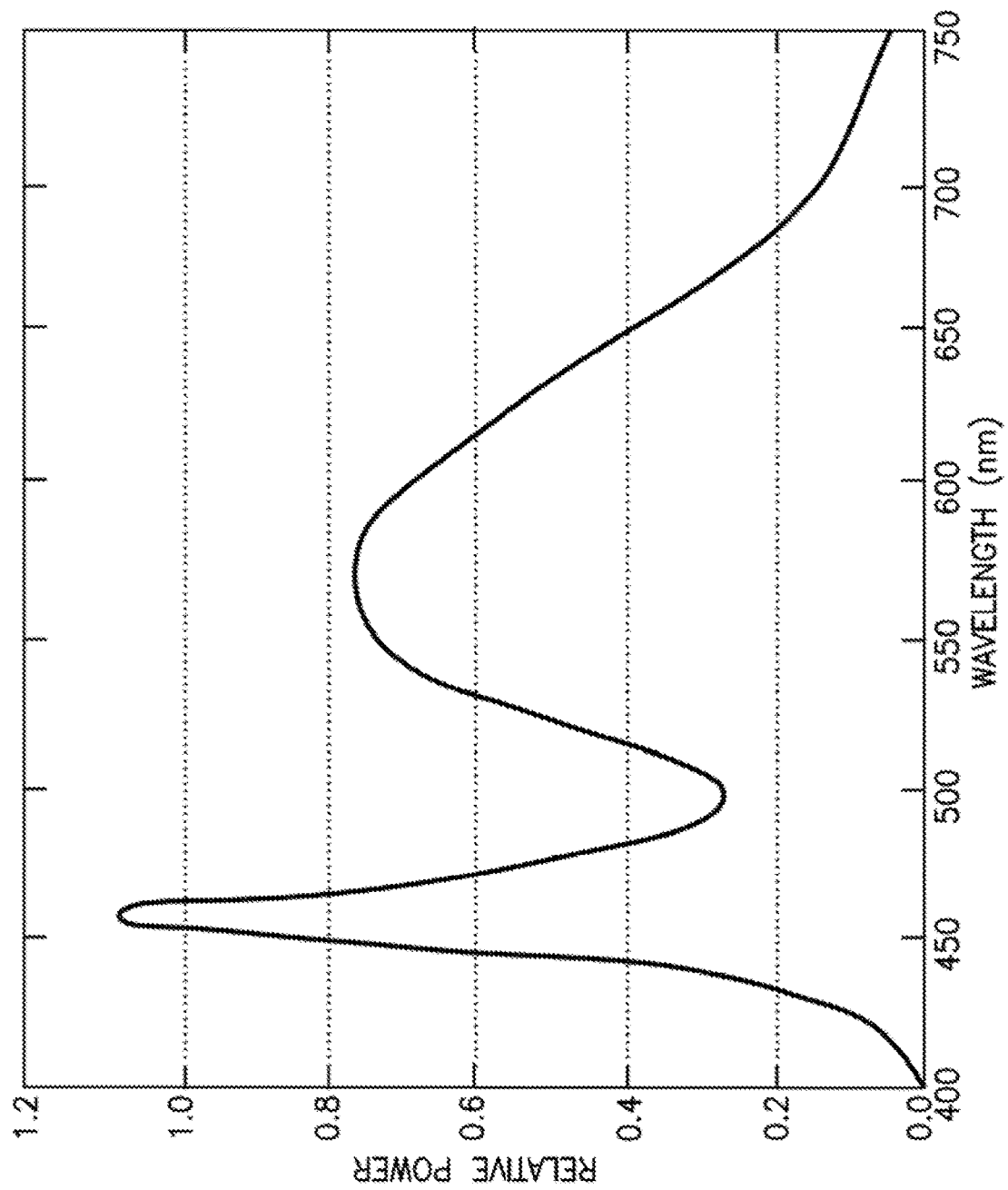
FIG. 4 shows the optical spectrum of light emitted by a white-light LED used as a luminaire light source, according to at least one illustrated implementation.

FIG. 4 shows the optical spectrum of light emitted by a white-light LED used as a luminaire light source. In the example depicted, substantially all of the spectrum being below about 750 nm—the relative power output of the solid state light source is less than about 0.1 at that wavelength. Therefore, the phototransistor Q200 is substantially insensitive to the shorter wavelengths emitted by the white LED, i.e., it is responsive primarily to wavelengths of light outside the emitted light band of wavelengths that the solid state light source emits.

Referring again to FIG. 2, in implementations, the photosensor 210 may be mounted on an LED off-line driver board and the output of the photosensor 210, e.g., the output voltage at the junction 215 of the source of the phototransistor Q200 and the bias resistor R200, may be communicatively coupled to an analog input 230 of the microcontroller 220 (which may be as a Bluetooth wireless module). In implementations, the microcontroller 220 may be, e.g., a BL652 series Bluetooth v5+near field communication (NFC) wireless module (Laird PLC), which is based on the Nordic Semiconductor nRF52832 Bluetooth Low Energy (BLE) chipset. The BL652 modules are supported with an event-driven programming language that enables development of an embedded application inside the BL652 hardware. In implementations, the output of the photosensor 210 may be input to an analog input 230 (e.g., SIO_02/AINO) which functions as an analog-to-digital converter (ADC) having configurable input and reference pre-scaling and sample resolution (e.g., 8, 10, and 12 bit).

In disclosed embodiments, the microcontroller 220 digitizes the voltage level across bias resistor R200, which is indicative of the output of the photosensor 210, and compares the resulting digital value to one or more threshold values. The result of the comparison is used to control the operation of the lamp 120. To do so, the microcontroller 220 may output a control signal to a set of circuitry which performs, e.g., a switching operation to control a power input, or other control input, of the lamp 120. In addition, the microcontroller 220 may use the ambient light level, so measured, to dim or brighten the output of the lamp 120, e.g., by outputting a signal to dimming inputs of the lamp 120 (or to a set of circuitry connected to the dimming inputs), so that the light output changes in accordance with a determined function and/or algorithm relative to the ambient light level. Other embodiments may use a frequency or pulse-width output signal from a photo-integrated circuit which is sensitive to longer or shorter wavelengths than primarily emitted by the lamp 120. In such a case, the frequency, period, pulse width or other digital value may be compared to one or more digital values representing one or more threshold values for day or night. In other embodiments, transistor or integrated circuit comparators may be used to detect, e.g., daytime or nighttime external light conditions by comparing the voltage across bias resistor R200 with one or more threshold voltages or currents.

For implementations in which the luminaire 100 contains a retrofit LED replacement bulb powered by a legacy photo-control, the system may monitor the time of day of actuation of the photocontroller 200 using a real time clock. Approximately at each day-to-night or night-to-day actuation, the digitized photosensor values may be stored in non-volatile memory to be used by control algorithms to establish switching thresholds in the event of external photo-control failure.

In embodiments, a photosensor 210 (with or without an optical filter) may be used which has some sensitivity to the longest and shortest wavelengths emitted by the lamp 120, provided the energy contained in those wavelengths is not such that it causes the photocontroller 210 to falsely detect daytime when it is nighttime. In embodiments, the system may have hysteresis in either the software or hardware, such that the lamp 120 will have a different threshold for detecting nighttime when it is daytime versus daytime being detected when it is nighttime. The use of hysteresis may reduce optical and electrical noise susceptibility by the photocontroller.

In embodiments, the system stores minimum and maximum daily photosensor values each day, which are averaged over time and used to revise the thresholds as outside environmental changes occur, such as aging of the globe 110 (i.e., refractor or lens), loss or gain of nearby foliage, changes in nearby artificial light sources, and other changes occurring over time. For example, a decorative globe 110 made of polycarbonate resin may become less transparent with age, thereby transmitting lower ambient light values. In such a case, adjustment of the thresholds in view of the lower photosensor levels may provide more accurate turn-on and turn-off times, so that the outside ambient light level, e.g., about 4 foot-candles, remains closer to the optimal level for turning on or off the luminaire light output.

Embodiments may include a second, visible ambient light sensor 142, included in the housing 125 of the lamp 120, which has higher responsivity in the visible wavelengths emitted by LED light sources 150, in addition to the longer wavelength ambient light sensor 140 discussed above (the visible ambient light sensor 142 may receive light via the same port 145 as the longer wavelength ambient light sensor 140). During daytime external light conditions, both light sensors would measure high levels of natural ambient light. During nighttime external light conditions, only the visible ambient light sensor 142 would detect high levels of light emitted by the LED light sources 150 in the lamp 120. In such a case, the visible ambient light sensor 142 can be used to detect malfunction of the light sources 150 and/or control electronics. For example, during the daytime, the longer wavelength ambient light sensor 140 would measure the approximate level of natural light and the visible wavelength ambient light sensor 142 would measure the natural ambient light level. In the case of a "day burner" failure, the visible wavelength ambient light sensor 142 would measure the sum of the natural light and the light emitted from the light sources 150 of the lamp 120 due to the hypothetical control failure. In other words, if the light sources 150 of the lamp 120 are in the ON state during the daytime, this state can be detected by subtracting the natural light detected by the longer wavelength ambient light sensor 140 from the total light measured by the visible ambient light sensor 142.

In embodiments, the visible ambient light sensor 142 and the longer wavelength ambient light sensor 140 may be used to roughly calculate the level of yellowing, haze, and dirt accumulated over time on a plastic luminaire globe 110. To do so, the ambient light level in the visible wavelengths is measured when the lamp 120 is turned off, i.e., switched to the OFF state, and stored in non-volatile memory. The longer wavelength light level is recorded at approximately the same time of day and stored in non-volatile memory. Over time the ratio of visible to longer-wavelength light may become smaller as the plastic globe 110 begins to absorb more visible light than longer-wavelength light during the aging process. To counteract this effect, the output light level of the light sources 150 in the lamp 120 may be increased over time to keep the light emitted from the luminaire 100 relatively constant over the life of the globe 110 of the luminaire 100.

Figure 5:
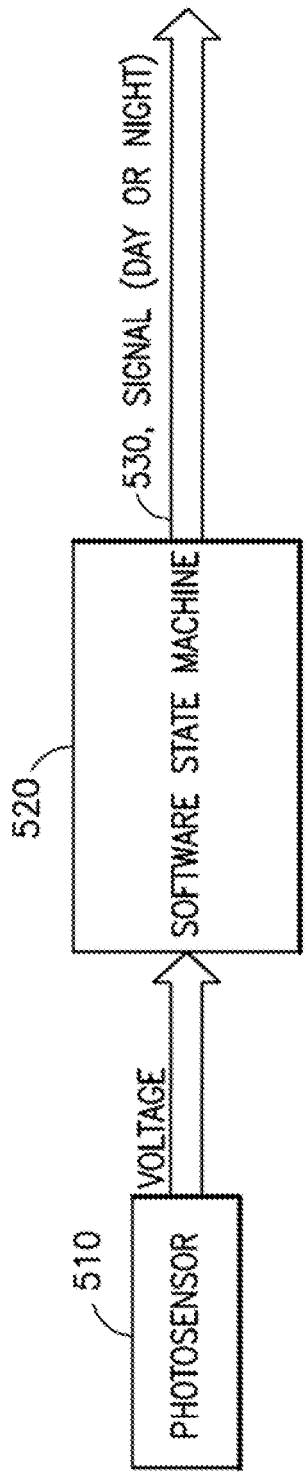
FIG. 5 is a block diagram of a hardware and software architecture for processing photosensor readings to obtain a day or night signal based on a software state machine, according to at least one illustrated implementation.
Figure 6:
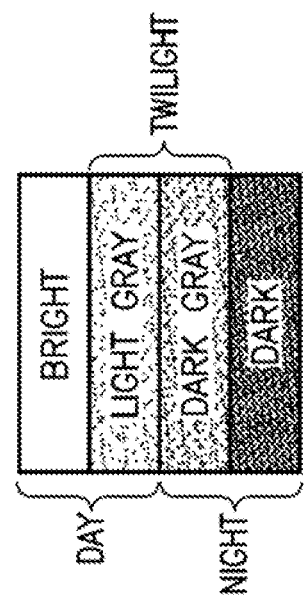
FIG. 6 depicts a defined set of light sensor level categories which are indicative of specific times of day, according to at least one illustrated implementation.

FIGS. 5-7 depict a photocontroller system, including software, to reduce the sensitivity of the system to normal changes in natural light levels due to clouds, passing automobiles, and other temporary causes. Optically-filtered photocontrollers may more accurately represent the human eye response curve, and also may give some immunity to reflected luminaire light from snow accumulation or foliage outside of the luminaire, but are not necessarily well suited for ephemeral environmental changes.

FIG. 5 is a block diagram of a hardware and software architecture for processing photosensor readings to obtain a day or night control signal based on a software state machine. In implementations, the photosensor 510 may be an integrated photocell which is integrated into the retrofit LED lamp 120 installed in the luminaire 100 (see FIG. 1). In the arrangement depicted, the output (e.g., voltage output) from the photosensor 510 is input to a processor running software having the architecture of a software state machine 520. As discussed in further detail below, as the photosensor 510 input fluctuates, specifically programmed transitions occur in the software state machine 520 which, in turn, define an output signal 530 indicative of day or night operation of the luminaire.

FIG. 6 depicts a defined set of light sensor level categories which are indicative of specific times of day and, hence, specific operating modes of the photocontroller and luminaire. The set of defined light sensor levels may correspond to a set of threshold values obtained from the software running on a processor of the photocontroller and/or stored in a memory of the photocontroller. Measured light levels obtained from the photosensor may be compared to the set of threshold values to categorize the received light level into one of the defined light sensor level categories, e.g., bright, light gray, dark gray, and dark. Received light levels in the bright and light gray categories correspond to day operation of the photocontroller and luminaire in which the luminaire (or, in implementations, the lamp which is installed in the luminaire globe) is in the OFF state. Received light levels in the dark gray and dark categories correspond to night operation of the photocontroller and luminaire in which the luminaire is in the ON state. Received light levels in the light gray and dark gray categories correspond to dawn or dusk periods in which the operation of the photocontroller and luminaire is susceptible to fluctuations between day and night operation due to ephemeral changes in environmental conditions.

FIG. 7 is a table representing operation of the software state machine running on a processor, and using memory of, the photocontroller. In a state machine architecture, the operation mode of the photocontroller depends on both the received light level reading and a currently designated state from among a set of defined states. In such a configuration, the correspondence between the received light level readings and the operation mode of the photocontroller and luminaire is not fixed. Rather, the correspondence depends on events occurring in the past, i.e., the events which have led to the state machine being in the currently designated state. Thus, in effect, the state machine is able to evaluate a transition from a past light level reading to a current received light level reading, rather than relying solely on the current received light level reading.

In a stateless software model, by way of comparison, there is a fixed correspondence between received light level readings and the resulting operation mode of the photocontroller. For example, bright or light gray light level readings always correspond to day operation and dark gray work dark light level readings always correspond to night operation. Therefore, the correspondence does not depend on events occurring in the past.

In implementations, the state machine periodically samples the photosensor output voltage and assigns it to one of a set of defined temporal states (e.g., a set of four temporal states as depicted in the table of FIG. 7). In such a case, the state machine always has a determined "current state" which is one of the set of defined temporal states. For example, a first temporal state may be defined as "stable day," which is indicative of a daytime light level, i.e., a high received light level, which has not yet begun to transition to a nighttime light level (i.e., has not begun to approach the dusk period). A second temporal state may be defined as "stable night," which is indicative of a nighttime light level, i.e., a low received light level, which has not yet begun to transition to a daytime light level (i.e., has not begun to approach the dawn period). A third temporal state may be defined as "newly day," which is indicative of a light level transitioning from night to day, but which is still in the dawn period. A fourth temporal state may be defined as "newly night," which is indicative of a light level transitioning from day to night, but which is still in the dusk period.

In the example of FIG. 7, the four defined temporal states—each of which may be designated as the current state—each correspond to a row in the state table of the state machine, while the defined set of four light sensor level categories each correspond to a column in the state table. This configuration results in a set of 16 possible state transitions, including combinations of current state and received light level reading which do not result in a change in the current state (e.g., when a bright light level is received while the current state is "stable day").

Thus, the state machine periodically evaluates the current light level in the context of the current state. The result of the evaluation is the output signal indicating day or night. The evaluation may also result in a change of the current state. As noted above, an aspect of the state machine is that once the day/night control signal has changed (e.g., from day to night or vice versa), no further control signal changes will occur until the light level has moved outside the twilight range.

For example, as dusk) approaches, a current state of "stable day" remains the current state, and the photocontroller continues to "signal day," as the light level reading passes from "bright" to "light gray." After the light level changes to "dark gray," the current state changes to "newly night" and the photocontroller begins to "signal night." In such a case, if the light level were to fluctuate between "dark gray" and "light gray," the photocontroller would continue to "signal night." Thus, after the photocontroller begins to "signal night" at dusk), the system remains in the "signal night" mode of operation as the light level changes to "dark" (at which point the current state changes to "stable night").

Similarly, as dawn approaches, a current state of "stable night" remains the current state, and the photocontroller continues to "signal night," as the light level reading passes from "dark" to "dark gray." After the light level changes to "light gray," the current state changes to "newly day" and the photocontroller begins to "signal day." In such a case, if the light level were to fluctuate between "light gray" and "dark gray," the photocontroller would continue to "signal day." Thus, after the photocontroller begins to "signal day" at dawn, the system remains in the "signal day" mode of operation as the light level changes to "bright" (at which point the current state changes to "stable day").

Figure 8:
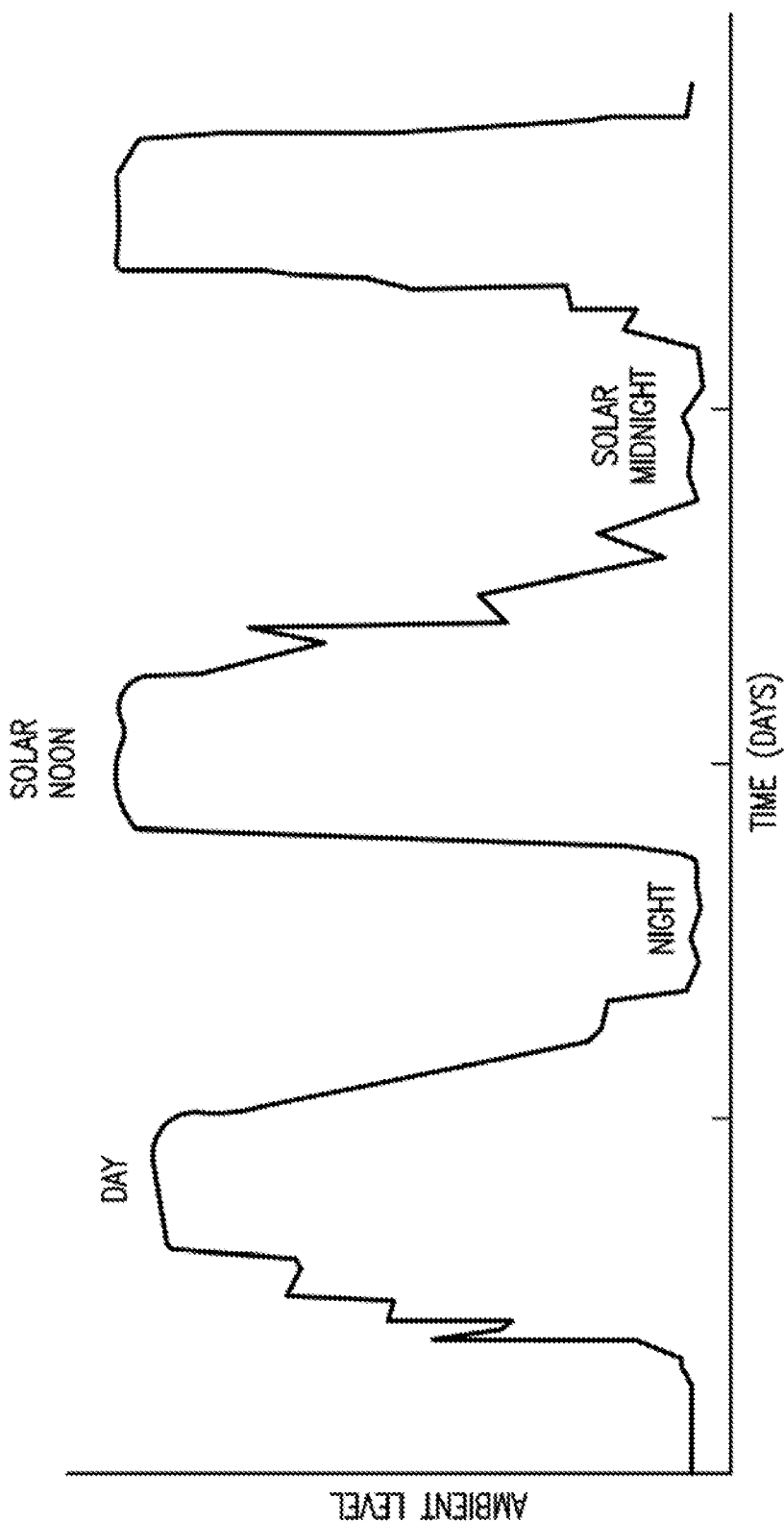
FIG. 8 represents photosensor data recorded over time to be used to calculate the solar time of day.

FIG. 8 is a graphic representation of photosensor data recorded over time to be used to calculate the solar time of day. Specifically, the plot shows ambient light level (e.g., in arbitrary units) detected by a photosensor which is sensitive to longer (and/or shorter) wavelengths than emitted by white LEDs versus time (e.g., in days). Recorded data of this type may be used to recalibrate a real time clock (RTC) implemented in software executed in the luminaire, which is used in the event of the failure of a primary photocontroller or contactor. The use of a software RTC eliminates the need for the luminaire to include a hardware RTC, as the microcontroller running the software RTC typically has an accurate enough crystal for many days of operation (versus many years of operation in the case of a precision hardware RTC). Such an implementation also eliminates the need for the luminaire to include a battery, which would typically be used with a hardware RTC to ensure that the correct time remains set even if, for example, the luminaire has been stored in a warehouse for several months before being powered on.

The recorded data are analyzed to find a specified reference time of day, such as solar midnight, to use in adjusting the RTC time so that it will correctly read midnight when solar midnight occurs (e.g., by computing a current time from the determined reference time and then adjusting the RTC if it differs from the computed current time). The recorded photosensor data is typically fairly noisy due to environmental effects, such as, for example, clouds passing over, rainy days, etc. Therefore, software-based filtering, smoothing, and/or analysis may be used to clean up the data to find the true solar time of day. For example, smoothing and filtering may be applied to the recorded data, followed by application of a peak search algorithm to find the locations of the peaks and troughs of the light intensity, as described in further detail below. Such an implementation enables use of a commercial grade crystal—despite the typical temperature drift and inaccuracy—in conjunction with the RTC calculations being done in the microcontroller instead of being obtained from a hardware RTC. If the power fails, or the luminaire is disconnected, at least one day of operation to gather ambient light data is performed to set the RTC to at least an approximately correct time of day.

In implementations, the microcontroller 220 receives signals from the photosensor 210 (or photosensors) which are indicative of levels of light sensed in the external environment. The microcontroller 220 may store information in memory, and/or to nonvolatile storage media, related to or indicative of the sensed levels of illumination. An analog-to-digital converter input of the microcontroller 220 may digitize the signals before further processing by the microcontroller 220. The microcontroller 220 can store the information so as to correlate or create logical relationships between the sensed levels and a time (e.g., real time) as indicated by the real time clock (RTC). The microcontroller 220 can use the information to determine times as indicated by the RTC (i.e., in the temporal reference frame of the clock) with the solar cycle for any daily cycle, and to control the light sources accordingly.

In implementations, the microcontroller 220 may determine the times as indicated by the clock at which a time of dusk and/or time of dawn occur based at least in part on the information stored in the nonvolatile storage media and/or memory. For example, the microcontroller 220 may determine the times at which solar midnight (i.e., average or median minimum light or illumination levels) and solar noon (i.e., average or median maximum light or illumination levels) occur, and set a time of dusk and/or time of dawn to be at the times which are midway between the time of dusk and/or time of dawn. Also for example, the microcontroller 220 may determine the times at which a particular rate of change occurs. For instance, the microcontroller 220 may determine the times at which a maximum rate of change occurs or when a minimum rate of change occurs. The times of maximum rate of change may correspond to the midpoints between solar midnight and solar noon, and may be set as the time of dusk and the time of dawn. The microcontroller 220 may determine a direction of change, for example whether the light or illumination level is increasing or decreasing. The microcontroller 220 may use such to match or relate the times of maximum rate of change respectively with solar midnight and solar noon. For instance, a time of maximum rate of change which occurs while the light or illumination level is increasing would indicate dawn, while a time of maximum rate of change which occurs while the light or illumination level is decreasing would indicate dusk. Relying on rate of change and direction may advantageously allow the microcontroller 220 determine the diurnal cycle in a relatively short period of time as compared to other approaches.

Figure 9:
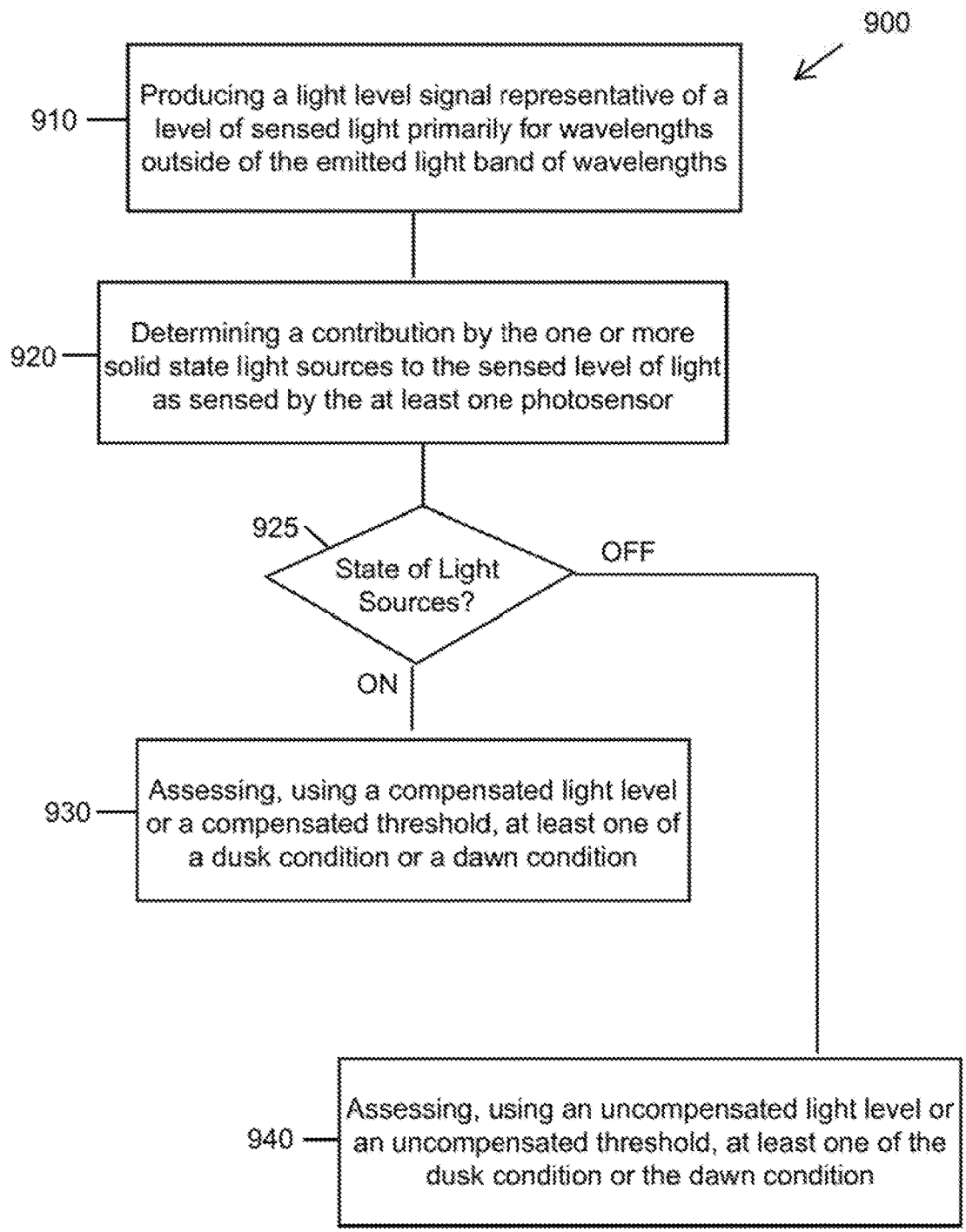
FIG. 9 is a flow diagram of a method of operation of a system to control one or more solid state light sources that cumulatively emit light across an emitted light band of wavelengths when in an ON state.

FIG. 9 shows a method 900 of operation of a system to control one or more solid state light sources that cumulatively emit light across an emitted light band of wavelengths when in an ON state. The system operated according to this method 900 includes or is communicatively coupled to at least one photosensor responsive primarily to wavelengths of light outside the emitted light band of wavelengths that the one or more solid state light sources emit when the one or more solid state light sources are in the ON state. The system also includes a set of circuitry (e.g., microcontroller, digital and/or analog circuitry) communicatively coupled to the at least one photosensor to receive the light level signal representative of the sensed level of light.

At 910, the at least one photosensor produces a light level signal representative of a level of sensed light primarily for wavelengths outside of the emitted light band of wavelengths. At 920, the set of circuitry determines a contribution by the one or more solid state light sources to the sensed level of light as sensed by the at least one photosensor. At 925, the set of circuitry determines whether the solid state light sources are in the ON state or the OFF state. If the solid state light sources are in the ON state, control passes to 930, while if the solid state light sources are in the OFF state control passes to 940.

At 930, the set of circuitry assesses a dusk condition or a dawn condition using a compensated light level or a compensated threshold. The compensated light level or the compensated threshold compensates for the contribution by the one or more solid state light sources to the sensed level of light as sensed by the at least one photosensor.

At 940, the set of circuitry assesses a dusk condition or a dawn condition using an uncompensated light level or an uncompensated threshold.

To determine the contribution by the one or more solid state light sources to the sensed level of light (920), the set of circuitry may compare (e.g., subtract): a level of light sensed at a first time in at least one diurnal cycle with the solid state lights sources in the ON state with a level of light sensed during a second time in the at least one diurnal cycle with the solid state light sources in an OFF state, where the second time is within a defined period (e.g., 5 seconds, 30 seconds, 1 minute, 2 minutes, 5 minutes) of time of the first time. Such may occur during a same diurnal cycle. Alternatively, to determine the contribution by the one or more solid state light sources to the sensed level of light (920), the set of circuitry may compare (e.g., subtract): a level of light sensed during a first relative period of time (e.g., 2 PM) in a first diurnal cycle with the solid state lights sources in the ON state with a level of light sensed during a same period of time (e.g., 2 PM) as the first period of time in second diurnal cycle with the solid state light sources in an OFF state, where the first diurnal cycle and the second diurnal cycle immediately adjacent one another (e.g., one day and the following day).

Alternatively or additionally, the set of circuitry may store a plurality of values that represent a respective level of light sensed when the solid state lights sources are in the ON state and/or store a plurality of values that represent a respective level of light sensed when the solid state lights sources are in the OFF state. Where values that represent a respective level of light sensed when the solid state lights sources are in the ON and the OFF state, the stored values should include an indication of whether they represent or correspond to a sampling in the ON state or the OFF state. For example, one portion of memory or one vector of stored values may be dedicated to ON state samples, while another portion of memory or a second vector of stored values are dedicated to OFF state samples.

The set of circuitry may store one or more values that represent (e.g., proportional) the determined contribution by the one or more solid state light sources to the sensed level of light. In some implementations, the set of circuitry may subtract the value of the determined contribution from a current value of the sensed level of light to produce a compensated sensed level of light before assessing a dusk condition or a dawn condition, using the compensated sensed level of light during periods when the solid state light sources are in the ON state and using an uncompensated sensed level of light when the solid state light sources are in the OFF state. In some implementations, the set of circuitry may adjust at least one of a dusk threshold or a dawn threshold, for example by adding the value of the determined contribution to a dusk threshold or a dawn threshold to produce a compensated dusk threshold and/or compensated dawn threshold before assessing a dusk condition or a dawn condition, using the compensated dusk threshold and/or compensated dawn threshold during periods when the solid state light sources are in the ON state and using an uncompensated dusk threshold and/or uncompensated dawn threshold when the solid state light sources are in the OFF state.

Figure 10:
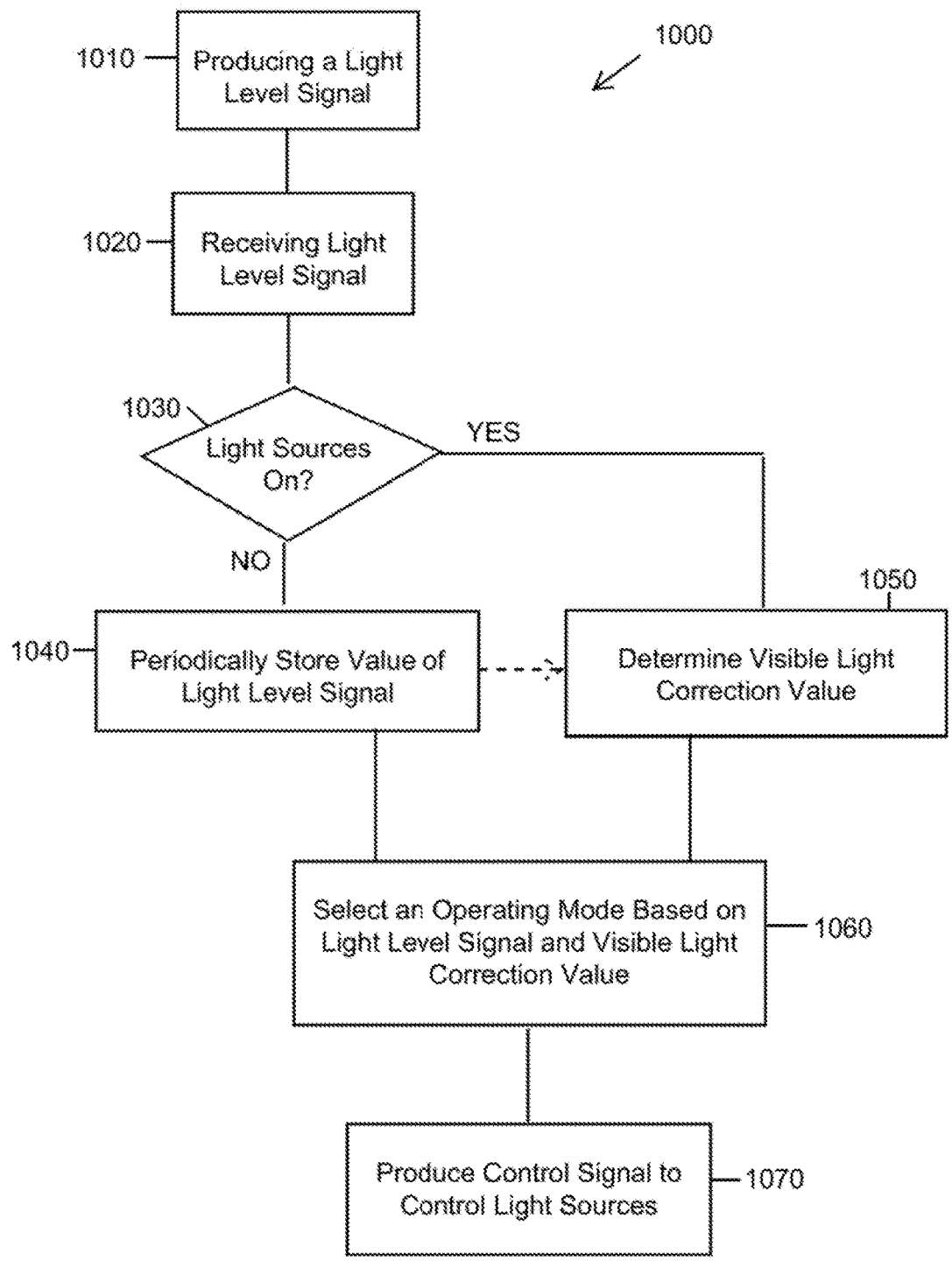
FIG. 10 is a flow diagram of a method of operation of a photocontroller, including selection of an operating mode based on a light level signal and a visible light correction value.

FIG. 10 shows a method 1000 of operation of a photocontroller, including selection of an operating mode based on a light level signal and a visible light correction value. As in the embodiments above, the photocontroller is for use with a luminaire and one or more solid state light sources that cumulatively emit light across an emitted light band of wavelengths. The photocontroller includes a photosensor positioned to detect light in the environment external to the luminaire and responsive primarily to wavelengths of light outside the emitted light band of wavelengths that the solid state light source emit. The photocontroller also includes a microcontroller communicatively coupled to the photosensor. As a practical matter, as noted above, the photosensor may detect some amount of visible light. Therefore, a visible light correction value is determined and used to control the solid state light sources, as described in further detail below.

The visible light correction value is determined based on differences between light level measurements made while the solid state light sources are in the ON state and the OFF state. In at least some implementations, the ON-state and OFF-state light level values used in the determination of the visible light correction value are measured within a short time window (e.g., under 1 minute) to avoid possible inaccuracies due to fluctuating visible light in the environment. For example, the ON-state and OFF-state light level values may be measured just as the solid state light sources switch from the OFF state to the ON state, or vice versa. This ON/OFF switching typically occurs twice in a 24 hour period—at dusk and dawn. To determine the visible light correction value in this manner at other times of the 24 hour cycle, it would be necessary to perform an undesirable blinking of the solid state light sources during an operational period, i.e., during a period of the night or day in which the solid state light sources were meant to be constantly in an ON state or an OFF state, respectively.

In implementations, light level measurements performed by the photocontroller are periodically stored while the solid state light sources are in the OFF state (i.e., during the day). When the solid state light sources are switched to the ON state (i.e., at dusk), the periodically stored OFF-state light level measurement is retrieved and used to determine the visible light correction value. The computed visible light correction value is used during the subsequent operational period while the solid state light sources are in the ON state (i.e., during the night), as this is when the photosensor potentially receives visible light from the solid state light sources.

At 1010, the at least one photosensor produces a light level signal representative of a level of light in the external environment primarily for wavelengths outside of the emitted light band of wavelengths. At 1020, the microcontroller receives light level signal. At 1030, it is determined whether the one or more solid state light sources (e.g., LEDs) are in the OFF state (i.e., not in the ON state), and if in the OFF state the microcontroller at 1040 periodically stores the value of the received light level in memory. This stored value is used as a reference, i.e., baseline, value because the photosensor does not receive any contribution of visible light from the solid state light sources while the solid state light sources are in the OFF state. The storing of the reference value (1040) may, for example, be repeated periodically until the solid state light sources are switched to the ON state.

In at least some implementations, the periodic storing in memory of the value of the light level signal received while the solid state light sources are in the OFF state may be performed only if the photocontroller is functioning properly. For example, the storing may be performed only if there has been at least one instance, within a preceding 24 hours, of the microcontroller changing the solid state light sources from the ON state to the OFF state, or from the OFF state to the ON state.

At 1050, the microcontroller determines a visible light correction value, for example by subtracting the periodically stored value of the light level signal received while the solid state light sources were in the OFF state from a value of the light level signal received while the solid state light sources are in the ON state. This determined difference provides a measure of the visible light received by the photosensor contributed by the solid state light sources. In at least some implementations, the microcontroller may be operable to change the solid state light sources from the OFF state to the ON state based on an assessment of a dusk condition using a light level signal compensated by a visible light correction value determined in a previous iteration of the method 1000.

In at least some implementations, light level measurements performed by the photocontroller are periodically stored while the solid state light sources are in the ON state (i.e., during the night). The stored light level values are used as a reference for a received light level which includes visible light, because the photosensor potentially receives visible light from the solid state light sources while they are in the ON state. A visible light correction value may be determined by taking the periodically stored value of the light level signal received while the solid state light sources were in the ON state and subtracting a value of the light level signal received while the solid state light sources are in the OFF state. This computed difference provides a measure of the visible light received by the photosensor from the solid state light sources. The computed visible light correction value may be used during a subsequent operational period while the solid state light sources are in the ON state (e.g., during the following night), as this is when the photosensor potentially receives visible light from the solid state light sources.

At 1060, the microcontroller determines an operating mode of the photocontroller, which may, for example, be selected based at least in part on the received light level signal representative of the level of light in the external environment primarily for wavelengths outside of the emitted light band of wavelengths (which may include some amount of visible light) and the determined visible light correction value. In the selection of the operating mode, a corrected light level signal is determined by subtracting the determined visible light correction value from the received light level signal. Thus, the corrected light level signal is the received light level signal adjusted to account for the visible light received by the photosensor from the solid state light sources. The corrected light level signal is applicable only when the solid state light sources are in the ON state, because that is when visible light is potentially being received by the photosensor. Therefore, a current light sensor level category is determined based at least in part on the received light level signal (i.e., the uncorrected light level signal) while the solid state light sources are in the OFF state and based at least in part on the corrected light level signal while the solid state light sources are in the ON state. At 1070, the microcontroller produces a control signal to control an operation of the solid state light sources based at least in part on the selected operating mode of the photocontroller in a manner similar to that discussed above with respect to other embodiments.

In alternative embodiments, rather than determining a corrected light level signal, a corrected set of light level threshold values may be determined by subtracting the determined visible light correction value from a set of light level threshold values stored in the memory of the photocontroller. The corrected light level threshold values are applicable only when the solid state light sources are in the ON state. Therefore, a current light sensor level category is determined based at least in part on comparing the light level signal representative of the level of light in the external environment primarily for wavelengths outside of the emitted light band of wavelengths (which may include some amount of visible light) to: (i) the set of light level threshold values stored in the memory of the photocontroller, while the one or more solid state light sources are in the OFF state; and (ii) the set of corrected light level threshold values, while the one or more solid state light sources are in the ON state. As noted above, at 1070, the microcontroller produces a control signal to control an operation of the solid state light sources based at least in part on the selected operating mode of the photocontroller in a manner similar to that discussed above with respect to other embodiments.

The various implementations and embodiments described above can be combined to provide further implementations and embodiments. All of the commonly assigned US patent application publications, US patent applications, foreign patents, and foreign patent applications referred to in this specification and/or listed in the Application Data Sheet, including but not limited to: U.S. Provisional Patent Application No. 61/052,924, filed May 13, 2008; U.S. Pat. No. 8,926,138, issued Jan. 6, 2015; PCT Publication No. WO2009/140141, published Nov. 19, 2009; U.S. Provisional Patent Application No. 61/051,619, filed May 8, 2008; U.S. Pat. No. 8,118,456, issued Feb. 21, 2012; PCT Publication No. WO2009/137696, published Nov. 12, 2009; U.S. Provisional Patent Application No. 61/088,651, filed Aug. 13, 2008; U.S. Pat. No. 8,334,640, issued Dec. 18, 2012; U.S. Provisional Patent Application No. 61/115,438, filed Nov. 17, 2008; U.S. Provisional Patent Application No. 61/154,619, filed Feb. 23, 2009; U.S. Patent Publication No. 2010/0123403, published May 20, 2010; U.S. Patent Publication No. 2016/0021713, published Jan. 21, 2016; PCT Publication No. WO2010/057115, published May 20, 2010; U.S. Provisional Patent Application No. 61/174,913, filed May 1, 2009; U.S. Pat. No. 8,926,139, issued Jan. 6, 2015; PCT Publication No. WO2010/127138, published Nov. 4, 2010; U.S. Provisional Patent Application No. 61/180,017, filed May 20, 2009; U.S. Pat. No. 8,872,964, issued Oct. 28, 2014; U.S. Patent Publication No. 2015/0015716, published Jan. 15, 2015; PCT Publication No. WO2010/135575, published Nov. 25, 2010; U.S. Provisional Patent Application No. 61/229,435, filed Jul. 29, 2009; U.S. Patent Publication No. 2011/0026264, published Feb. 3, 2011; U.S. Provisional Patent Application No. 61/295,519, filed Jan. 15, 2010; U.S. Provisional Patent Application No. 61/406,490, filed Oct. 25, 2010; U.S. Pat. No. 8,378,563, issued Feb. 19, 2013; PCT Publication No. WO2011/088363, published Jul. 21, 2011; U.S. Provisional Patent Application No. 61/333,983, filed May 12, 2010; U.S. Pat. No. 8,541,950, issued Sep. 24, 2013; PCT Publication No. WO2010/135577, published Nov. 25, 2010; U.S. Provisional Patent Application No. 61/346,263, filed May 19, 2010; U.S. Pat. No. 8,508,137, issued Aug. 13, 2013; U.S. Pat. No. 8,810,138, issued Aug. 19, 2014; U.S. Pat. No. 8,987,992, issued Mar. 24, 2015; PCT Publication No. WO2010/135582, published Nov. 25, 2010; U.S. Provisional Patent Application No. 61/357,421, filed Jun. 22, 2010; U.S. Pat. No. 9,241,401, granted Jan. 19, 2016; PCT Publication No. WO2011/163334, published Dec. 29, 2011; U.S. Pat. No. 8,901,825, issued Dec. 2, 2014; U.S. Patent Publication No. 2015/0084520, published Mar. 26, 2015; PCT Publication No. WO2012/142115, published Oct. 18, 2012; U.S. Pat. No. 8,610,358, issued Dec. 17, 2013; U.S. Provisional Patent Application No. 61/527,029, filed Aug. 24, 2011; U.S. Pat. No. 8,629,621, issued Jan. 14, 2014; PCT Publication No. WO2013/028834, published Feb. 28, 2013; U.S. Provisional Patent Application No. 61/534,722, filed Sep. 14, 2011; U.S. Pat. No. 9,312,451, issued Apr. 12, 2016; PCT Publication No. WO2013/040333, published Mar. 21, 2013; U.S. Provisional Patent Application No. 61/567,308, filed Dec. 6, 2011; U.S. Pat. No. 9,360,198, issued Jun. 7, 2016; U.S. Provisional Patent Application No. 61/561,616, filed Nov. 18, 2011; U.S. Patent Publication No. 2013/0141010, published Jun. 6, 2013; PCT Publication No. WO2013/074900, published May 23, 2013; U.S. Provisional Patent Application No. 61/641,781, filed May 2, 2012; U.S. Patent Publication No. 2013/0293112, published Nov. 7, 2013; U.S. Patent Publication No. 2013/0229518, published Sep. 5, 2013; U.S. Provisional Patent Application No. 61/640,963, filed May 1, 2012; U.S. Patent Publication No. 2013/0313982, published Nov. 28, 2013; U.S. Patent Publication No. 2014/0028198, published Jan. 30, 2014; U.S. Pat. No. 9,801,248, issued Oct. 24, 2017; PCT Publication No. WO2014/018773, published Jan. 30, 2014; U.S. Provisional Patent Application No. 61/723,675, filed Nov. 7, 2012; U.S. Pat. No. 9,301,365, issued Mar. 29, 2016; U.S. Provisional Patent Application No. 61/692,619, filed Aug. 23, 2012; U.S. Patent Publication No. 2014/0055990, published Feb. 27, 2014; U.S. Provisional Patent Application No. 61/694,159, filed Aug. 28, 2012; U.S. Pat. No. 8,878,440, issued Nov. 4, 2014; U.S. Patent Publication No. 2014/0062341, published Mar. 6, 2014; U.S. Patent Publication No. 2015/0077019, published Mar. 19, 2015; PCT Publication No. WO2014/039683, published Mar. 13, 2014; U.S. Provisional Patent Application No. 61/728,150, filed Nov. 19, 2012; U.S. Patent Publication No. 2014/0139116, published May 22, 2014; U.S. Pat. No. 9,433,062, issued Aug. 30, 2016; PCT Publication No. WO2014/078854, published May 22, 2014; U.S. Provisional Patent Application No. 61/764,395, filed Feb. 13, 2013; U.S. Pat. No. 9,288,873, issued Mar. 15, 2016; U.S. Provisional Patent Application No. 61/849,841, filed Jul. 24, 2013; U.S. Patent Publication No. 2015/0028693, published Jan. 29, 2015; PCT Publication No. WO2015/013437, published Jan. 29, 2015; U.S. Provisional Patent Application No. 61/878,425, filed Sep. 16, 2013; U.S. Patent Publication No. 2015/0078005, published Mar. 19, 2015; PCT Publication No. WO2015/039120, published Mar. 19, 2015; U.S. Provisional Patent Application No. 61/933,733, filed Jan. 30, 2014; U.S. Pat. No. 9,185,777, issued Nov. 10, 2015; PCT Publication No. WO2015/116812, published Aug. 6, 2015; U.S. Provisional Patent Application No. 61/905,699, filed Nov. 18, 2013; U.S. Pat. No. 9,414,449, issued Aug. 9, 2016; U.S. Pat. No. 9,781,797, issued Oct. 3, 2017; U.S. Provisional Patent Application No. 62/068,517, filed Oct. 24, 2014; U.S. Provisional Patent Application No. 62/183,505, filed Jun. 23, 2015; U.S. Pat. No. 9,445,485, issued Sep. 13, 2016; PCT Publication No. WO2016/064542, published Apr. 28, 2016; U.S. Provisional Patent Application No. 62/082,463, filed Nov. 20, 2014; U.S. Publication No. 2016/0150369, published May 26, 2016; PCT Publication No. WO2016/081071, published May 26, 2016; U.S. Provisional Patent Application No. 62/057,419, filed Sep. 30, 2014; U.S. Publication No. 2016/0095186, published Mar. 31, 2016; PCT Publication No. WO2016/054085, published Apr. 7, 2016; U.S. Provisional Patent Application No. 62/114,826, filed Feb. 11, 2015; U.S. Non-provisional patent application Ser. No. 14/939,856, filed Nov. 12, 2015; U.S. Provisional Patent Application No. 62/137,666, filed Mar. 24, 2015; U.S. Non-provisional patent application Ser. No. 14/994,569, filed Jan. 13, 2016; U.S. Non-provisional patent application Ser. No. 14/844,944, filed Sep. 3, 2015; U.S. Provisional Patent Application No. 62/208,403, filed Aug. 21, 2015; U.S. Non-provisional patent application Ser. No. 15/238,129, filed Aug. 16, 2016; U.S. Provisional Patent Application No. 62/264,694, filed Dec. 8, 2015; U.S. Non-provisional patent application Ser. No. 15/369,559, filed Dec. 5, 2016; U.S. Provisional Patent Application No. 62/397,709, filed Sep. 21, 2016; U.S. Non-provisional patent application Ser. No. 15/709,022, filed Sep. 19, 2017; U.S. Provisional Patent Application No. 62/397,713, filed Sep. 21, 2016; U.S. Non-provisional patent application Ser. No. 15/709,028, filed Sep. 19, 2017; U.S. Provisional Patent Application No. 62/327,939, filed Apr. 26, 2016; U.S. Non-provisional patent application Ser. No. 15/496,985, filed Apr. 25, 2017; U.S. Provisional Patent Application No. 62/379,037, filed Aug. 24, 2016; U.S. Non-provisional patent application Ser. No. 15/681,927, filed Aug. 21, 2017; U.S. Provisional Patent Application No. 62/458,970, filed Feb. 14, 2017; U.S. Non-provisional patent application Ser. No. 15/895,439, filed Feb. 13, 2018; U.S. Provisional Patent Application No. 62/480,833, filed Apr. 3, 2017; U.S. Non-provisional patent application Ser. No. 15/943,183, Apr. 2, 2018; U.S. Provisional Patent Application No. 62/507,730, filed May 17, 2017; U.S. Non-provisional patent application Ser. No. 15/980,978, filed May 16, 2018; U.S. Non-provisional patent application Ser. No. 15/799,744, filed Oct. 31, 2017; U.S. Provisional Patent Application No. 62/669,883, filed May 10, 2018; U.S. Provisional Patent Application No. 62/701,392, filed Jul. 20, 2018; U.S. patent application Ser. No. 16/517,137, filed Jul. 19, 2019 (now published as US2020/0029404); U.S. patent application Ser. No. 16/842,924, filed Apr. 8, 2020; U.S. patent application 62/864,121, filed Jun. 20, 2019; and U.S. patent application 63/010,412, filed Apr. 15, 2020, are each incorporated herein by reference, in their entirety. These and other changes can be made to the embodiments in light of the above-detailed description.

The various embodiments described above can be combined and/or modified to provide further embodiments in light of the above-detailed description, including the material incorporated by reference. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A photocontroller for use with a luminaire and one or more solid state light sources that cumulatively emit light across an emitted light band of wavelengths, the photocontroller comprising:

at least one photosensor including a first ambient light sensor positioned to detect light in an external environment that is external to the luminaire and responsive primarily to wavelengths of light outside the emitted light band of wavelengths that the one or more solid state light sources emit when the one or more solid state light sources are in an ON state, wherein the first ambient light sensor produces a first light level signal representative of a level of light in the external environment primarily for wavelengths outside of the emitted light band of wavelengths, the at least one photosensor further including a second ambient light sensor that is more responsive to wavelengths in the emitted light band of wavelengths than the first ambient light sensor, wherein the second ambient light sensor produces a second light level signal;

a microcontroller communicatively coupled to the at least one photosensor to receive both the first light level signal and the second light level signal, the microcontroller operable to compare the first light level signal to the second light level signal.

2. The photocontroller of claim 1 wherein the microcontroller changes a state of the control signal to change the one or more solid state light sources from the ON state to an OFF state, or from the OFF state to the ON state.

3. The photocontroller of claim 1 wherein a responsivity spectrum of the first ambient light sensor is primarily at wavelengths above about 750 nm.

4. The photocontroller of claim 1 wherein a responsivity spectrum of the first ambient light sensor is primarily at wavelengths above wavelengths of visible light.

5. The photocontroller of claim 1 wherein the photocontroller comprises an optical filter to block from the first ambient light sensor light in the external environment primarily for wavelengths of light inside the emitted light band of wavelengths.

6. The photocontroller of claim 1 wherein the photosensor comprises a phototransistor communicatively coupled to output a current from a source in response to received ambient light, the source being connected to ground through a resistor to produce an output voltage at the junction of the source and the resistor.

7. The photocontroller of claim 6 wherein the output voltage of the photosensor is communicatively coupled to an analog-to-digital converter input of the microcontroller.

8. The photocontroller of claim 7 wherein the microcontroller is operable to determine a digital value, representing a received light level, based at least in part on analog-to-digital conversion of the output voltage of the photosensor received by the analog-to-digital converter input of the microcontroller, and the microcontroller is further operable to perform a comparison of the received light level to a stored switching threshold.

9. The photocontroller of claim 8 wherein the microcontroller is operable to output the control signal to control the one or more solid state light sources based at least in part on the comparison of the digital value representing the received light level to the stored switching threshold.

10. The photocontroller of claim 9 wherein the microcontroller is operable to store in memory minimum and maximum values of the digital value representing the received light level at actuations of the one or more solid state light sources by the control signal, and to determine a revised switching threshold based on the stored minimum and maximum values.

11. The photocontroller of claim 1 wherein the first ambient light sensor has a first responsivity spectrum, a substantial portion of which is at wavelengths longer than a wavelength range of visible light, and the second ambient light sensor has a second responsivity spectrum which includes wavelengths in the wavelength range of visible light.

12. The photocontroller of claim 11 wherein the microcontroller is operable to determine an external light condition based at least in part on the first light level signal and is further operable to produce a control signal to control an operation of the one or more solid state light sources based at least in part on the determination of the external light condition.

13. The photocontroller of claim 1 wherein the microcontroller is operable to compare the first light level signal to a set of light level threshold values stored in a memory of the photocontroller to determine a current light sensor level category.

14. The photocontroller of claim 13 wherein, based at least in part on the current light sensor level category and a current designated temporal state from a set of defined temporal states, the microcontroller is operable to:
select an operating mode of the photocontroller; and
designate a subsequent temporal state from the set of defined temporal states.

15. The photocontroller of claim 14 wherein the current designated temporal state corresponds to a temporal period from a set of temporal periods comprising: dawn, day, dusk, and night.

16. The photocontroller of claim 14 wherein the selected operating mode of the photocontroller is from a set comprising: a day operating mode and a night operating mode.

17. The photocontroller of claim 1 wherein the microcontroller, in response to the comparison of the first light level signal to the second light level signal, is operable to:
compute a time of day based at least in part on the light level signal;
recalibrate a real time clock of the luminaire based on the computed time of day; and
use the real time clock to control operation of the one or more solid state light sources in an event of failure of the photocontroller.

18. The photocontroller of claim 1 wherein, to compute a time of day based at least in part on the first light level signal, the microcontroller is operable to:
store in memory a plurality of values of the first light level signal;
analyze the stored plurality of values of the first light level signal to determine a specified reference time of day; and
compute a current time of day based on the determined specified reference time of day.

19. The photocontroller of claim 1 wherein the microcontroller is further operable to:
determine a value that represents a contribution of the one or more solid state light sources to the light detected by the at least one photosensor, where the contribution occurs when the one or more light sources are in the ON state; and
adjust operation to accommodate for the contribution of the one or more solid state light sources to the light detected by the at least one photosensor.

20. The photocontroller of claim 1 wherein the microcontroller is further operable to:
determine a contribution by the one or more solid state light sources to the sensed level of light as detected by the at least one photosensor, and, to use a compensated light level or a compensated threshold in assessing at least one of a dusk condition or a dawn condition when the solid state light sources are in the ON state, where the compensated light level or the compensated threshold are compensate for the contribution by the one or more solid state light sources to the sensed level of light as detected by the at least one photosensor.

21. The photocontroller of claim 1 wherein the microcontroller is further operable to:
maintain a state of the one or more light sources at least until the level of light in the external environment leaves a defined range.

22. A lamp for use in a luminaire having a socket, comprising:
a housing having an exterior, an interior, and a base to communicatively couple to the socket of the luminaire;
one or more solid state light sources that cumulatively emit light across an emitted light band of wavelengths when the one or more solid state light sources are in an ON state;
a photocontroller to control operation of the one or more solid state light sources, the photocontroller comprising a set of circuitry housed in the interior of the housing, the set of circuitry including:
at least one photosensor including a first ambient light sensor positioned to detect light in an external environment that is external to the luminaire and responsive primarily to wavelengths of light outside the emitted light band of wavelengths that the one or more solid state light sources emit and which produces a first light level signal representative of a level of light in the external environment for wavelengths primarily outside of the emitted light band of wavelengths, the at least one photosensor further including a second ambient light sensor that is more responsive to wavelengths in the emitted light band of wavelengths than the first ambient light sensor, wherein the second ambient light sensor produces a second light level signal, and
a microcontroller operably coupled to the at least one photosensor to receive both the first light level signal and the second light level signal, the microcontroller operable to compare the first light level signal to the second light level signal.

23. The lamp of claim 22 wherein the microcontroller is further operable to:
determine a value that represents a contribution of the one or more solid state light sources to the light detected by the at least one photosensor, where the contribution occurs when the one or more light sources are in the ON state; and
adjust operation to accommodate for the contribution of the one or more solid state light sources to the light detected by the at least one photosensor.

24. The lamp of claim 22 wherein the microcontroller is further operable to:
determine a contribution by the one or more solid state light sources to the sensed level of light as detected by the at least one photosensor, and, to use a compensated light level or a compensated threshold in assessing at least one of a dusk condition or a dawn condition when the solid state light sources are in the ON state, where the compensated light level or the compensated threshold are compensate for the contribution by the one or more solid state light sources to the sensed level of light as detected by the at least one photosensor.

25. A method of operation of a photocontroller for use with a luminaire and one or more solid state light sources that cumulatively emit light across an emitted light band of wavelengths, the photocontroller comprising at least one photosensor positioned to detect light in an external environment that is external to the luminaire and responsive primarily to wavelengths of light outside the emitted light band of wavelengths that the solid state light source emit, and a microcontroller communicatively coupled to the at least one photosensor, the method comprising:
producing, by a first ambient light sensor of the at least one photosensor, a first light level signal representative of a level of light in the external environment for a first range of wavelengths primarily for wavelengths outside of the emitted light band of wavelengths;
producing, by a second ambient light sensor of the at least one photosensor, a second light level signal representative of a level of light in the external environment for a second range of wavelengths that is different than the first range of wavelengths and that includes wavelengths inside of the emitted light band of wavelengths;
receiving, by the microcontroller, the first light level signal and the second light level signal;
and
comparing, by the microcontroller, the first light level signal to the second light level signal.

26. The method of claim 25, further comprising:
selecting an operating mode of the photocontroller based at least in part on the first light level signal; and
producing a control signal to control an operation of the one or more solid state light sources based at least in part on the selected operating mode of the photocontroller; and
determining, by the microcontroller, a current light sensor level category based at least in part on the first light level signal,
wherein, in determining the current light sensor level category, the first light level signal is compared to a set of light level threshold values stored in the memory of the photocontroller.

27. The method of claim 25, further comprising:
determining a value that represents a contribution of the one or more solid state light sources to the light detected by the at least one photosensor, where the contribution occurs when the one or more light sources are in the ON state; and
adjusting operation to accommodate for the contribution of the one or more solid state light sources to the light detected by the at least one photosensor.

28. The method of claim 25, further comprising:
determining a contribution by the one or more solid state light sources to the sensed level of light as detected by the at least one photosensor, and,
assessing at least one of a dusk condition or a dawn condition when the solid state light sources are in the ON state based at least in part on a compensated light level or a compensated threshold, where the compensated light level or the compensated threshold are compensate for the contribution by the one or more solid state light sources to the sensed level of light as detected by the at least one photosensor.

* * * * *